US009881456B2

(12) United States Patent
Arnone et al.

(10) Patent No.: US 9,881,456 B2
(45) Date of Patent: *Jan. 30, 2018

(54) SPONSORED HYBRID SYSTEMS

(71) Applicant: Gamblit Gaming, LLC, Glendale, CA (US)

(72) Inventors: Miles Arnone, Sherborn, MA (US); Caitlyn Ross, Watertown, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,711

(22) Filed: Dec. 12, 2016

(65) Prior Publication Data
US 2017/0092065 A1 Mar. 30, 2017

Related U.S. Application Data

(63) Continuation of application No. 14/720,626, filed on May 22, 2015, now Pat. No. 9,536,383, which is a
(Continued)

(51) Int. Cl.
A63F 9/24 (2006.01)
G07F 17/32 (2006.01)

(52) U.S. Cl.
CPC ...... G07F 17/3255 (2013.01); G07F 17/3227 (2013.01); G07F 17/3262 (2013.01); G07F 17/3272 (2013.01)

(58) Field of Classification Search
CPC .. G06Q 50/34; G07F 17/3244; G07F 17/3262
(Continued)

(56) References Cited

U.S. PATENT DOCUMENTS 5,413,357 A 5/1995 Schulze et al.
5,718,429 A 2/1998 Keller
(Continued)

FOREIGN PATENT DOCUMENTS

JP 2001300098 A 10/2001
JP 2003111980 A 4/2003
(Continued)

OTHER PUBLICATIONS

U.S. Appl. No. 15/063,365 Arnone, et al., filed Mar. 7, 2016.
(Continued)

Primary Examiner — Masud Ahmed
(74) Attorney, Agent, or Firm — Caitlyn Ross

(57) ABSTRACT

An electronic game machine allowing for a sponsored hybrid system includes: a real world controller coupled to a game world controller over a network, the real world controller constructed to provide a randomly generated payout of real world credits; an entertainment software controller coupled to the game world controller, wherein the entertainment software controller is configured to execute an entertainment game; and the game world controller coupled to the entertainment software controller, a non-player interface, and the real world controller by the network, wherein the game world controller is constructed to: access a database containing a player profile of the player and a sponsor profile of a non-player; receive from the non-player interface, sponsorship terms involving allocation of gameplay resources during sponsored gameplay of the hybrid game; allocate gameplay resources associated with the sponsor profile to the player profile based on the sponsorship terms; and allocate gameplay resources resulting from a payout of gameplay resources.

18 Claims, 8 Drawing Sheets

Related U.S. Application Data continuation of application No. 14/312,623, filed on Jun. 23, 2014, now Pat. No. 9,039,521, which is a continuation of application No. 14/083,331, filed on Nov. 18, 2013, now Pat. No. 8,758,122, which is a continuation of application No. 13/935,468, filed on Jul. 3, 2013, now Pat. No. 8,602,881, which is a continuation of application No. PCT/US2012/065937, filed on Nov. 19, 2012.

(60) Provisional application No. 61/629,437, filed on Nov. 19, 2011.

(58) Field of Classification Search
USPC .......................................... 463/16–25, 40–42
See application file for complete search history.

(56) References Cited

U.S. PATENT DOCUMENTS

| | | |
|---|---|---|
| 5,785,592 A | 7/1998 | Jacobsen |
| 5,853,324 A | 12/1998 | Kami et al. |
| 5,963,745 A | 10/1999 | Collins et al. |
| 6,050,895 A | 4/2000 | Luciano |
| 6,165,071 A | 12/2000 | Weiss |
| 6,227,974 B1 | 5/2001 | Eilat |
| 6,267,669 B1 | 7/2001 | Luciano |
| 6,685,563 B1 | 2/2004 | Meekins et al. |
| 6,712,693 B1 | 3/2004 | Hettinger |
| 6,761,632 B2 | 7/2004 | Bansemer et al. |
| 6,761,633 B2 | 7/2004 | Riendeau |
| 6,764,397 B1 | 7/2004 | Robb |
| 6,811,482 B2 | 11/2004 | Letovsky |
| 7,118,105 B2 | 10/2006 | Benevento |
| 7,294,058 B1 | 11/2007 | Slomiany |
| 7,326,115 B2 | 2/2008 | Baerlocher |
| 7,361,091 B2 | 4/2008 | Letovsky |
| 7,517,282 B1 | 4/2009 | Pryor |
| 7,575,517 B2 | 8/2009 | Parham et al. |
| 7,682,239 B2 | 3/2010 | Friedman et al. |
| 7,720,733 B2 | 5/2010 | Jung |
| 7,753,770 B2 | 7/2010 | Walker et al. |
| 7,753,790 B2 | 7/2010 | Nguyen |
| 7,766,742 B2 | 8/2010 | Bennett et al. |
| 7,775,885 B2 | 8/2010 | Van Luchene |
| 7,798,896 B2 | 9/2010 | Katz |
| 7,828,657 B2 | 11/2010 | Booth |
| 7,917,371 B2 | 3/2011 | Jung et al. |
| 7,931,531 B2 | 4/2011 | Oberberger |
| 7,938,727 B1 | 5/2011 | Konkle |
| 7,950,993 B2 | 5/2011 | Oberberger |
| 7,967,674 B2 | 6/2011 | Baerlocher |
| 7,980,948 B2 | 7/2011 | Rowe |
| 7,996,264 B2 | 8/2011 | Kusumoto et al. |
| 8,012,023 B2 | 9/2011 | Gates |
| 8,047,908 B2 | 11/2011 | Walker |
| 8,047,915 B2 | 11/2011 | Lyle |
| 8,060,829 B2 | 11/2011 | Jung et al. |
| 8,075,383 B2 | 12/2011 | Friedman et al. |
| 8,087,999 B2 | 1/2012 | Oberberger |
| 8,113,938 B2 | 2/2012 | Friedman et al. |
| 8,118,654 B1 | 2/2012 | Nicolas |
| 8,128,487 B2 | 3/2012 | Hamilton et al. |
| 8,135,648 B2 | 3/2012 | Oram |
| 8,137,193 B1 | 3/2012 | Kelly et al. |
| 8,142,272 B2 | 3/2012 | Walker |
| 8,157,653 B2 | 4/2012 | Buhr |
| 8,167,699 B2 | 5/2012 | Inamura |
| 8,177,628 B2 | 5/2012 | Manning |
| 8,182,338 B2 | 5/2012 | Thomas |
| 8,182,339 B2 | 5/2012 | Anderson |
| 8,187,068 B2 | 5/2012 | Slomiany |
| 8,206,210 B2 | 6/2012 | Walker |
| 8,308,544 B2 | 11/2012 | Friedman |
| 8,430,735 B2 | 4/2013 | Oberberger |
| 8,475,266 B2 | 7/2013 | Amone |
| 8,480,470 B2 | 7/2013 | Napolitano et al. |
| 8,622,809 B1 | 1/2014 | Arora et al. |
| 8,864,564 B2 | 10/2014 | Oberberger |
| 2001/0004609 A1 | 6/2001 | Walker et al. |
| 2001/0019965 A1 | 9/2001 | Ochi |
| 2002/0022509 A1 | 2/2002 | Nicastro |
| 2002/0090990 A1 | 7/2002 | Joshi et al. |
| 2002/0175471 A1 | 11/2002 | Faith |
| 2003/0060286 A1 | 3/2003 | Walker et al. |
| 2003/0119576 A1 | 6/2003 | McClintic et al. |
| 2003/0139214 A1 | 7/2003 | Wolf et al. |
| 2003/0171149 A1 | 9/2003 | Rothschild |
| 2003/0204466 A1 | 10/2003 | Guo et al. |
| 2003/0211879 A1 | 11/2003 | Englman |
| 2004/0092313 A1 | 5/2004 | Saito et al. |
| 2004/0097610 A1 | 5/2004 | Saito |
| 2004/0102238 A1 | 5/2004 | Taylor |
| 2004/0121839 A1 | 6/2004 | Webb |
| 2004/0225387 A1 | 11/2004 | Smith |
| 2005/0003878 A1 | 1/2005 | Updike |
| 2005/0096124 A1 | 5/2005 | Stronach |
| 2005/0116411 A1 | 6/2005 | Herrmann et al. |
| 2005/0192087 A1 | 9/2005 | Friedman et al. |
| 2005/0233791 A1 | 10/2005 | Kane |
| 2005/0233806 A1 | 10/2005 | Kane et al. |
| 2005/0239538 A1 | 10/2005 | Dixon |
| 2005/0269778 A1 | 12/2005 | Samberg |
| 2005/0288101 A1 | 12/2005 | Lockton et al. |
| 2006/0003823 A1 | 1/2006 | Zhang |
| 2006/0003830 A1 | 1/2006 | Walker et al. |
| 2006/0035696 A1 | 2/2006 | Walker |
| 2006/0040735 A1 | 2/2006 | Baerlocher |
| 2006/0068913 A1 | 3/2006 | Walker et al. |
| 2006/0084499 A1 | 4/2006 | Moshal |
| 2006/0084505 A1 | 4/2006 | Yoseloff |
| 2006/0135250 A1 | 6/2006 | Rossides |
| 2006/0154710 A1 | 7/2006 | Serafat |
| 2006/0166729 A1 | 7/2006 | Saffari et al. |
| 2006/0189371 A1 | 8/2006 | Walker et al. |
| 2006/0223611 A1 | 10/2006 | Baerlocher |
| 2006/0234791 A1 | 10/2006 | Nguyen et al. |
| 2006/0240890 A1 | 10/2006 | Walker |
| 2006/0246403 A1 | 11/2006 | Monpouet et al. |
| 2006/0258433 A1 | 11/2006 | Finocchio et al. |
| 2007/0026924 A1 | 2/2007 | Taylor |
| 2007/0035548 A1 | 2/2007 | Jung et al. |
| 2007/0038559 A1 | 2/2007 | Jung et al. |
| 2007/0064074 A1 | 3/2007 | Silverbrook et al. |
| 2007/0087799 A1 | 4/2007 | Van Luchene |
| 2007/0093299 A1 | 4/2007 | Bergeron |
| 2007/0099696 A1 | 5/2007 | Nguyen et al. |
| 2007/0117641 A1 | 5/2007 | Walker et al. |
| 2007/0129149 A1 | 6/2007 | Walker |
| 2007/0142108 A1 | 6/2007 | Linard |
| 2007/0156509 A1 | 7/2007 | Jung et al. |
| 2007/0167212 A1 | 7/2007 | Nguyen |
| 2007/0167239 A1 | 7/2007 | O'Rourke |
| 2007/0173311 A1 | 7/2007 | Morrow et al. |
| 2007/0191104 A1 | 8/2007 | Van Luchene |
| 2007/0202941 A1 | 8/2007 | Miltenberger |
| 2007/0203828 A1 | 8/2007 | Jung et al. |
| 2007/0207847 A1 | 9/2007 | Thomas |
| 2007/0259717 A1 | 11/2007 | Mattice |
| 2007/0293306 A1 | 12/2007 | Nee et al. |
| 2008/0004107 A1 | 1/2008 | Nguyen et al. |
| 2008/0014835 A1 | 1/2008 | Weston et al. |
| 2008/0015004 A1 | 1/2008 | Gatto et al. |
| 2008/0064488 A1 | 3/2008 | Oh |
| 2008/0070659 A1 | 3/2008 | Naicker |
| 2008/0070690 A1 | 3/2008 | Van Luchene |
| 2008/0070702 A1 | 3/2008 | Kaminkow |
| 2008/0096665 A1 | 4/2008 | Cohen |
| 2008/0108406 A1 | 5/2008 | Oberberger |
| 2008/0108425 A1 | 5/2008 | Oberberger |
| 2008/0113704 A1 | 5/2008 | Jackson |
| 2008/0119283 A1 | 5/2008 | Baerlocher |
| 2008/0146308 A1 | 6/2008 | Okada |
| 2008/0161081 A1 | 7/2008 | Berman |

(56) References Cited

U.S. PATENT DOCUMENTS

| | | |
|---|---|---|
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0275393 A1 | 11/2009 | Kisenwether |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0285869 A1 | 11/2010 | Walker |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0045896 A1 | 2/2011 | Sak et al. |
| 2011/0070945 A1 | 3/2011 | Walker |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0302311 A1 | 11/2012 | Luciano |
| 2012/0322545 A1 | 12/2012 | Amone et al. |
| 2013/0029760 A1 | 1/2013 | Wickett |
| 2013/0131848 A1 | 5/2013 | Amone et al. |
| 2013/0190074 A1 | 7/2013 | Amone et al. |
| 2013/0260869 A1 | 10/2013 | Leandro et al. |
| 2014/0087801 A1 | 3/2014 | Nicely et al. |
| 2014/0087808 A1 | 3/2014 | Leandro et al. |
| 2014/0087809 A1 | 3/2014 | Leupp et al. |
| 2014/0357350 A1 | 12/2014 | Weingardt et al. |

FOREIGN PATENT DOCUMENTS

| | | |
|---|---|---|
| JP | 2004097610 A | 4/2004 |
| JP | 2004166746 A | 6/2004 |
| WO | 9851384 A1 | 11/1998 |
| WO | 2010087090 A1 | 8/2010 |
| WO | 2012139083 A1 | 10/2012 |
| WO | WO 20130059308 A1 | 4/2013 |
| WO | 2013075129 A1 | 5/2013 |
| WO | 2013075135 A1 | 5/2013 |
| WO | 2013059308 A1 | 4/2014 |

OTHER PUBLICATIONS

U.S. Appl. No. 15/063,496 Arnone, et al., filed Mar. 7, 2016.
U.S. Appl. No. 15/073,602 Arnone, et al., filed Mar. 17, 2016.
U.S. Appl. No. 15/074,999 Arnone, et al., filed Mar. 18, 2016.
U.S. Appl. No. 15/077,574 Arnone, et al., filed Mar. 22, 2016.
U.S. Appl. No. 15/083,284 Arnone, et al., filed Mar. 28, 2016.
U.S. Appl. No. 15/091,395 Arnone, et al., filed Apr. 5, 2016.
U.S. Appl. No. 15/093,685 Arnone, et al., filed Apr. 7, 2016.
U.S. Appl. No. 15/098,287 Arnone, et al., filed Apr. 13, 2016.
U.S. Appl. No. 15/098,313 Arnone, et al., filed Apr. 13, 2016.
U.S. Appl. No. 15/130,101 Arnone, et al., filed Apr. 15, 2016.
U.S. Appl. No. 15/133,624 Arnone, et al., filed Apr. 20, 2016.
U.S. Appl. No. 15/134,852 Arnone, et al., filed Apr. 21, 2016.
U.S. Appl. No. 15/139,148 Arnone, et al., filed Apr. 26, 2016.
U.S. Appl. No. 15/141,784 Arnone, et al., filed Apr. 29, 2016.
U.S. Appl. No. 15/155,107 Arnone, et al., filed May 16, 2016.
U.S. Appl. No. 15/156,222 Arnone, et al., filed May 16, 2016.
U.S. Appl. No. 15/158,530 Arnone, et al., filed May 18, 2016.
U.S. Appl. No. 15/161,174 Arnone, et al., filed May 20, 2016.
U.S. Appl. No. 15/170,773 Arnone, et al., filed Jun. 1, 2016.
U.S. Appl. No. 15/174,995 Arnone, et al., filed Jun. 6, 2016.
U.S. Appl. No. 15/179,940 Arnone, et al., filed Jun. 10, 2016.
U.S. Appl. No. 15/189,797 Arnone, et al., filed Jun. 22, 2016.
U.S. Appl. No. 15/190,745 Arnone, et al., filed Jun. 23, 2016.
U.S. Appl. No. 15/191,050 Arnone, et al., filed Jun. 23, 2016.
U.S. Appl. No. 15/219,257 Arnone, et al., filed Jul. 25, 2016.

(56) References Cited

OTHER PUBLICATIONS

U.S. Appl. No. 15/227,881 Arnone, et al., filed Aug. 3, 2016.
U.S. Appl. No. 15/241,683 Arnone, et al., filed Aug. 19, 2016.
U.S. Appl. No. 15/245,040 Arnone, et al., filed Aug. 23, 2016.
U.S. Appl. No. 15/233,294 Arnone, et al., filed Aug. 24, 2016.
U.S. Appl. No. 15/252,190 Arnone, et al., filed Aug. 30, 2016.
U.S. Appl. No. 15/255,789 Arnone, et al., filed Sep. 2, 2016.
U.S. Appl. No. 15/261,858 Arnone, et al., filed Sep. 9, 2016.
U.S. Appl. No. 15/264,521 Arnone, et al., filed Sep. 13, 2016.
U.S. Appl. No. 15/264,557 Arnone, et al., filed Sep. 13, 2016.
U.S. Appl. No. 15/271,214 Arnone, et al., filed Sep. 20, 2016.
U.S. Appl. No. 15/272,318 Arnone, et al., filed Sep. 21, 2016.
U.S. Appl. No. 15/273,260 Arnone, et al., filed Sep. 22, 2016.
U.S. Appl. No. 15/276,469 Arnone, et al., filed Sep. 26, 2016.
U.S. Appl. No. 15/280,255 Arnone, et al., filed Sep. 29, 2016.
U.S. Appl. No. 15/286,922 Arnone, et al., filed Oct. 6, 2016.
U.S. Appl. No. 15/287,129 Arnone, et al., filed Oct. 6, 2016.
U.S. Appl. No. 15/289,648 Arnone, et al., filed Oct. 10, 2016.
U.S. Appl. No. 15/297,019 Arnone, et al., filed Oct. 18, 2016.
U.S. Appl. No. 15/298,533 Arnone, et al., filed Oct. 20, 2016.
U.S. Appl. No. 15/336,696 Arnone, et al., filed Oct. 27, 2016.
U.S. Appl. No. 15/339,898 Arnone, et al., filed Oct. 31, 2016.
U.S. Appl. No. 15/345,451 Arnone, et al., filed Nov. 11, 2016.
U.S. Appl. No. 14/799,481 Arnone, et al., filed Jul. 14, 2015.
U.S. Appl. No. 14/188,587 Arnone, et al., filed Feb. 24, 2014.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al., filed Apr. 17, 2014.
U.S. Appl. No. 14/263,988 Arnone, et al., filed Apr. 28, 2014.
U.S. Appl. No. 14/270,335 Arnone, et al., filed May 5, 2014.
U.S. Appl. No. 14/271,360 Arnone, et al., filed May 6, 2014.
U.S. Appl. No. 13/961,849 Arnone, et al., filed Aug. 7, 2013.
U.S. Appl. No. 13/746,850 Arnone, et al., filed Jan. 22, 2013.
U.S. Appl. No. 14/288,169 Arnone, et al., filed May 27, 2014.
U.S. Appl. No. 14/304,027 Arnone, et al., filed Jun. 13, 2014.
U.S. Appl. No. 14/306,187 Arnone, et al., filed Jun. 16, 2014.
U.S. Appl. No. 14/312,623 Arnone, et al., filed Jun. 23, 2014.
U.S. Appl. No. 14/330,249 Arnone, et al., filed Jul. 14, 2014.
U.S. Appl. No. 14/339,142 Arnone, et al., filed Jul. 23, 2014.
U.S. Appl. No. 14/458,206 Arnone, et al., filed Aug. 12, 2014.
U.S. Appl. No. 14/461,344 Arnone, et al., filed Aug. 15, 2014.
U.S. Appl. No. 14/462,516 Arnone, et al., filed Aug. 18, 2014.
U.S. Appl. No. 14/467,646 Meyerhofer, et al., filed Aug. 25, 2014.
U.S. Appl. No. 14/474,023 Arnone, et al., filed Aug. 29, 2014.
U.S. Appl. No. 14/486,895 Arnone, et al., filed Sep. 15, 2014.
U.S. Appl. No. 14/507,206 Arnone, et al., filed Oct. 6, 2014.
U.S. Appl. No. 14/521,338 Arnone, et al., filed Oct. 22, 2014.
U.S. Appl. No. 14/535,808 Arnone, et al., filed Nov. 7, 2014.
U.S. Appl. No. 14/535,816 Arnone, et al., filed Nov. 7, 2014.
U.S. Appl. No. 14/536,231 Arnone, et al., filed Nov. 7, 2014.
U.S. Appl. No. 14/536,280 Arnone, et al., filed Nov. 7, 2014.
U.S. Appl. No. 14/549,137 Arnone, et al., filed Nov. 20, 2014.
U.S. Appl. No. 14/550,802 Arnone, et al., filed Nov. 21, 2014.
U.S. Appl. No. 14/555,401 Arnone, et al., filed Nov. 26, 2014.
U.S. Appl. No. 14/559,840 Arnone, et al., filed Dec. 3, 2014.
U.S. Appl. No. 14/564,834 Arnone, et al., filed Dec. 9, 2014.
U.S. Appl. No. 14/570,746 Arnone, et al., filed Dec. 15, 2014.
U.S. Appl. No. 14/570,857 Arnone, et al., filed Dec. 15, 2014.
U.S. Appl. No. 14/586,626 Arnone, et al., filed Dec. 30, 2014.
U.S. Appl. No. 14/586,639 Arnone, et al., filed Dec. 30, 2014.
U.S. Appl. No. 14/815,764 Arnone, et al., filed Jul. 31, 2015.
U.S. Appl. No. 14/815,774 Arnone, et al., filed Jul. 31, 2015.
U.S. Appl. No. 14/817,032 Arnone, et al., filed Aug. 3, 2015.
U.S. Appl. No. 14/822,890 Arnone, et al., filed Aug. 10, 2015.
U.S. Appl. No. 14/823,951 Arnone, et al., filed Aug. 11, 2015.
U.S. Appl. No. 14/823,987 Arnone, et al., filed Aug. 11, 2015.
U.S. Appl. No. 14/825,056 Arnone, et al., filed Aug. 12, 2015.
U.S. Appl. No. 14/835,590 Arnone, et al., filed Aug. 25, 2015.
U.S. Appl. No. 14/836,902 Arnone, et al., filed Aug. 26, 2015.
U.S. Appl. No. 14/839,647 Arnone, et al., filed Aug. 28, 2015.
U.S. Appl. No. 14/842,684 Arnone, et al., filed Sep. 1, 2015.
U.S. Appl. No. 14/842,785 Arnone, et al., filed Sep. 1, 2015.
U.S. Appl. No. 14/854,021 Arnone, et al., filed Sep. 14, 2015.
U.S. Appl. No. 14/855,322 Arnone, et al., filed Sep. 15, 2015.
U.S. Appl. No. 14/859,065 Arnone, et al., filed Sep. 18, 2015.
U.S. Appl. No. 14/865,422 Arnone, et al., filed Sep. 25, 2015.
U.S. Appl. No. 14/867,809 Arnone, et al., filed Sep. 28, 2015.
U.S. Appl. No. 14/868,287 Arnone, et al., filed Sep. 28, 2015.
U.S. Appl. No. 14/868,364 Arnone, et al., filed Sep. 28, 2015.
U.S. Appl. No. 14/869,809 Arnone, et al., filed Sep. 29, 2015.
U.S. Appl. No. 14/869,819 Arnone, et al., filed Sep. 29, 2015.
U.S. Appl. No. 14/885,894 Arnone, et al., filed Oct. 16, 2015.
U.S. Appl. No. 14/919,665 Arnone, et al., filed Oct. 21, 2015.
U.S. Appl. No. 14/942,844 Arnone, et al., filed Nov. 16, 2015.
U.S. Appl. No. 14/942,883 Arnone, et al., filed Nov. 16, 2015.
U.S. Appl. No. 14/949,759 Arnone, et al., filed Nov. 23, 2015.
U.S. Appl. No. 14/952,758 Arnone, et al., filed Nov. 25, 2015.
U.S. Appl. No. 14/952,769 Arnone, et al., filed Nov. 25, 2015.
U.S. Appl. No. 14/954,922 Arnone, et al., filed Nov. 30, 2015.
U.S. Appl. No. 14/954,931 Arnone, et al., filed Nov. 30, 2015.
U.S. Appl. No. 14/955,000 Arnone, et al., filed Nov. 30, 2015.
U.S. Appl. No. 14/956,301 Arnone, et al., filed Dec. 1, 2015.
U.S. Appl. No. 14/965,231 Arnone, et al., filed Dec. 10, 2015.
U.S. Appl. No. 14/965,846 Arnone, et al., filed Dec. 10, 2015.
U.S. Appl. No. 14/981,640 Arnone, et al., filed Dec. 28, 2015.
U.S. Appl. No. 14/981,775 Arnone, et al., filed Dec. 28, 2015.
U.S. Appl. No. 14/984,943 Arnone, et al., filed Dec. 30, 2015.
U.S. Appl. No. 14/984,965 Arnone, et al., filed Dec. 30, 2015.
U.S. Appl. No. 14/984,978 Arnone, et al., filed Dec. 30, 2015.
U.S. Appl. No. 14/985,107 Arnone, et al., filed Dec. 30, 2015.
U.S. Appl. No. 14/995,151 Arnone, et al., filed Jan. 13, 2016.
U.S. Appl. No. 14/974,432 Arnone, et al., filed Dec. 18, 2015.
U.S. Appl. No. 14/997,413 Arnone, et al., filed Jan. 15, 2016.
U.S. Appl. No. 15/002,233 Arnone, et al., filed Jan. 20, 2016.
U.S. Appl. No. 15/005,944 Arnone, et al., filed Jan. 25, 2016.
U.S. Appl. No. 15/011,322 Arnone, et al., filed Jan. 29, 2016.
U.S. Appl. No. 15/051,535 Arnone, et al., filed Feb. 23, 2016.
U.S. Appl. No. 15/053,236 Arnone, et al., filed Feb. 25, 2016.
U.S. Appl. No. 15/057,095 Arnone, et al., filed Feb. 29, 2016.
U.S. Appl. No. 15/060,502 Arnone, et al., filed Mar. 3, 2016.
itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.
Changing the Virtual Self: Avatar Transformations in Popular Games; Barr et al., Victoria Univ., NZ, 2006.
Real-Time Multimodal Human-Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
International Search Report and Written Opinion, PCT/US2012/65937, dated Feb. 6, 2013.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/935,410, Arnone, et al., filed Jul. 3, 2013.

(56) References Cited

OTHER PUBLICATIONS

U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
Canadian Intellectual Property Office (CIPO), First Examination Report, CIPO Application No. 2,835,958, dated Feb. 19, 2014.
U.S. Appl. No. 14/586,645 Arnone, et al., filed Dec. 30, 2014.
U.S. Appl. No. 14/598,151 Arnone, et al., filed Jan. 15, 2015.
U.S. Appl. No. 14/601,063 Arnone, et al., filed Jan. 20, 2015.
U.S. Appl. No. 14/601,108 Arnone, et al., filed Jan. 20, 2015.
U.S. Appl. No. 14/608,000 Arnone, et al., filed Jan. 28, 2015.
U.S. Appl. No. 14/608,087 Arnone, et al., filed Jan. 28, 2015.
U.S. Appl. No. 14/608,093 Arnone, et al., filed Jan. 28, 2015.
U.S. Appl. No. 14/610,897 Arnone, et al., filed Jan. 30, 2015.
U.S. Appl. No. 14/611,077 Arnone, et al., filed Jan. 30, 2015.
U.S. Appl. No. 14/604,629 Arnone, et al., filed Jan. 23, 2015.
U.S. Appl. No. 14/625,475 Arnone, et al., filed Feb. 18, 2015.
U.S. Appl. No. 14/617,852 Arnone, et al., filed Feb. 9, 2015.
U.S. Appl. No. 14/627,428 Arnone, et al., filed Feb. 20, 2015.
U.S. Appl. No. 14/642,427 Arnone, et al., filed Mar. 9, 2015.
U.S. Appl. No. 14/665,991 Arnone, et al., filed Mar. 23, 2015.
U.S. Appl. No. 14/666,010 Arnone, et al., filed Mar. 23, 2015.
U.S. Appl. No. 14/666,022 Arnone, et al., filed Mar. 23, 2015.
U.S. Appl. No. 14/642,623 Arnone, et al., filed Mar. 9, 2015.
U.S. Appl. No. 14/663,337 Arnone, et al., filed Mar. 19, 2015.
U.S. Appl. No. 14/666,284 Arnone, et al., filed Mar. 23, 2015.
U.S. Appl. No. 14/679,885 Arnone, et al., filed Apr. 6, 2015.
U.S. Appl. No. 14/685,378 Arnone, et al., filed Apr. 13, 2015.
U.S. Appl. No. 14/686,675 Arnone, et al., filed Apr. 14, 2015.
U.S. Appl. No. 14/686,678 Arnone, et al., filed Apr. 14, 2015.
U.S. Appl. No. 14/701,430 Arnone, et al., filed Apr. 30, 2015.
U.S. Appl. No. 14/703,721 Arnone, et al., filed May 4, 2015.
U.S. Appl. No. 14/708,138 Arnone, et al., filed May 8, 2015.
U.S. Appl. No. 14/708,141 Arnone, et al., filed May 8, 2015.
U.S. Appl. No. 14/708,160 Arnone, et al., filed May 8, 2015.
U.S. Appl. No. 14/708,161 Arnone, et al., filed May 8, 2015.
U.S. Appl. No. 14/708,162 Arnone, et al., filed May 8, 2015.
U.S. Appl. No. 14/710,483 Arnone, et al., filed May 12, 2015.
U.S. Appl. No. 14/714,084 Arnone, et al., filed May 15, 2015.
U.S. Appl. No. 14/715,463 Arnone, et al., filed May 18, 2015.
U.S. Appl. No. 14/720,620 Arnone, et al., filed May 22, 2015.
U.S. Appl. No. 14/720,624 Arnone, et al., filed May 22, 2015.
U.S. Appl. No. 14/720,626 Arnone, et al., filed May 22, 2015.
U.S. Appl. No. 14/727,726 Arnone, et al., filed Jun. 1, 2015.
U.S. Appl. No. 14/730,183 Arnone, et al., filed Jun. 3, 2015.
U.S. Appl. No. 14/731,321 Arnone, et al., filed Jun. 4, 2015.
U.S. Appl. No. 14/740,078 Arnone, et al., filed Jun. 15, 2015.
U.S. Appl. No. 14/742,517 Arnone, et al., filed Jun. 17, 2015.
U.S. Appl. No. 14/743,708 Arnone, et al., filed Jun. 18, 2015.
U.S. Appl. No. 14/746,731 Arnone, et al., filed Jun. 22, 2015.
U.S. Appl. No. 14/748,122 Arnone, et al., filed Jun. 23, 2015.
U.S. Appl. No. 14/788,581 Arnone, et al., filed Jun. 30, 2015.
U.S. Appl. No. 14/793,685 Arnone, et al., filed Jul. 7, 2015.
U.S. Appl. No. 14/793,704 Arnone, et al., filed Jul. 7, 2015.
U.S. Appl. No. 14/797,016 Arnone, et al., filed Jul. 10, 2015.

SPONSORED HYBRID SYSTEMS

CROSS REFERENCE TO RELATED APPLICATIONS

This application is a continuation of U.S. patent application Ser. No. 14/720,626, filed May 22, 2015, which is a continuation of U.S. patent application Ser. No. 14/312,623, filed Jun. 23, 2014, issued Jun. 24, 2014 as U.S. Pat. No. 9,039,521, which is a continuation of U.S. patent application Ser. No. 14/083,331, filed Nov. 18, 2013, issued Jun. 24, 2014 as U.S. Pat. No. 8,758,122, which is a continuation of U.S. patent application Ser. No. 13/935,468, filed Jul. 3, 2013, issued Dec. 10, 2013 as U.S. Pat. No. 8,602,881, which is a continuation of Patent Cooperation Treaty Application No. PCT/US12/65937 filed on Nov. 19, 2012, which claims the benefit of U.S. Provisional Patent Application No. 61/629,437 filed on Nov. 19, 2011, and is related to PCT patent application No. PCT/US11/26768, filed Mar. 1, 2011, U.S. Provisional Patent Application No. 61/459,131, filed Dec. 6, 2010, U.S. Provisional Patent Application No. 61/460,362, filed Dec. 31, 2010, U.S. Provisional Patent Application No. 61/516,693, filed Apr. 6, 2011, U.S. Provisional Patent Application No. 61/519,914, filed Jun. 1, 2011, U.S. Provisional Patent Application entitled "Enriched Table Top Game Play Environment (Single Or Multi-Player) For Casino Applications", filed Sep. 30, 2011, U.S. Provisional Patent Application entitled "SKILL-LEVELING IN ENRICHED GAME PLAY ENVIRONMENT (SINGLE AND/OR MULTI-PLAYER) FOR CASINO APPLICATIONS", filed Oct. 17, 2011, and U.S. Provisional Patent Application entitled "HEAD-TO-HEAD AND TOURNAMENT PLAY FOR ENRICHED GAME PLAY ENVIRONMENT (SINGLE AND/OR MULTI-PLAYER) FOR CASINO APPLICATIONS", filed Oct. 17, 2011 the contents of each of which are hereby incorporated by reference in their entirety as if stated in full herein.

FIELD OF THE INVENTION

Embodiments of the present invention are generally related to gaming and more specifically to a sponsored hybrid game that includes both an entertainment game and a gambling game with player gameplay sponsorable by a third party sponsor.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

SUMMARY OF THE INVENTION

Systems in accordance with embodiments of the invention operate a sponsored hybrid system. One embodiment includes a real world controller coupled to a game world controller over a network, wherein the real world controller is constructed to provide a randomly generated payout of real world credits from a wager in a gambling game of a hybrid game; an entertainment software controller coupled to the game world controller, wherein the entertainment software controller is configured to execute an entertainment game providing outcomes upon a player's skillful execution of an entertainment game of the hybrid game; and the game world controller coupled to the entertainment software controller, a non-player interface, and the real world controller by the network, wherein the game world controller is constructed to: access a database containing a player profile of the player and a sponsor profile of a non-player; receive from the non-player interface, sponsorship terms involving allocation of gameplay resources during sponsored gameplay of the hybrid game between the player profile and the sponsor profile, wherein the sponsorship terms are generated by the non-player interface; allocate gameplay resources associated with the sponsor profile to the player profile based on the sponsorship terms for use in the sponsored gameplay of the hybrid game by the player; and allocate gameplay resources resulting from a payout of gameplay resources during the sponsored gameplay using the sponsorship terms.

In some embodiments, the non-player interface presents information of the sponsor profile using a content filter to determine what information is accessible to the non-player interface.

In various embodiments, the hybrid game is played by a plurality of players, and wherein the content filter determines whether gameplay progress of the plurality of players is accessible.

In numerous embodiments, the content filter determines accessibility of information concerning the player profile in accordance with permissions set by a player associated with the player profile.

In several embodiments, the non-player interface presents information of players that can be sponsored.

In many embodiments, the non-player interface presents information of the sponsorship terms and acceptance of the sponsorship terms.

In some embodiments, the non-player interface is presents information of the payout of gameplay resources resulting from the sponsored gameplay.

In a further embodiment, the game world controller and the entertainment software controller are constructed from the same device, and the game world controller is operatively connected to the real world controller using a communication link.

In a further embodiment, the game world controller and the real world controller are constructed from the same device, and the game world controller and the entertainment software controller are coupled over the network.

In one embodiment, an entertainment software controller coupled to a game world controller, wherein the entertainment software controller is configured to execute an entertainment game providing outcomes upon a player's skillful execution of an entertainment game of a hybrid game; and the game world controller coupled to the entertainment software controller, a non-player interface, and a real world controller by a network, wherein the game world controller is constructed to: access a database containing a player profile of the player and a sponsor profile of a non-player; receive from the non-player interface, sponsorship terms involving allocation of gameplay resources during sponsored gameplay of the hybrid game between the player profile and the sponsor profile, wherein the sponsorship terms are generated by the non-player interface; allocate gameplay resources associated with the sponsor profile to the player profile based on the sponsorship terms for use in the sponsored gameplay of the hybrid game by the player; and allocate gameplay resources resulting from a payout of gameplay resources during the sponsored gameplay using the sponsorship terms.

In another embodiment, a real world controller coupled to a game world controller over a network, wherein the real world controller is constructed to provide a randomly generated payout of real world credits from a wager in a gambling game of a hybrid game; and the game world controller coupled to an entertainment software controller, a non-player interface, and the real world controller by the network, wherein the game world controller is constructed to: access a database containing a player profile of the player and a sponsor profile of a non-player; receive from the non-player interface, sponsorship terms involving allocation of gameplay resources during sponsored gameplay of the hybrid game between the player profile and the sponsor profile, wherein the sponsorship terms are generated by the non-player interface; allocate gameplay resources associated with the sponsor profile to the player profile based on the sponsorship terms for use in the sponsored gameplay of the hybrid game by the player; and allocate gameplay resources resulting from a payout of gameplay resources during the sponsored gameplay using the sponsorship terms.

DETAILED DESCRIPTION

Figure 1:
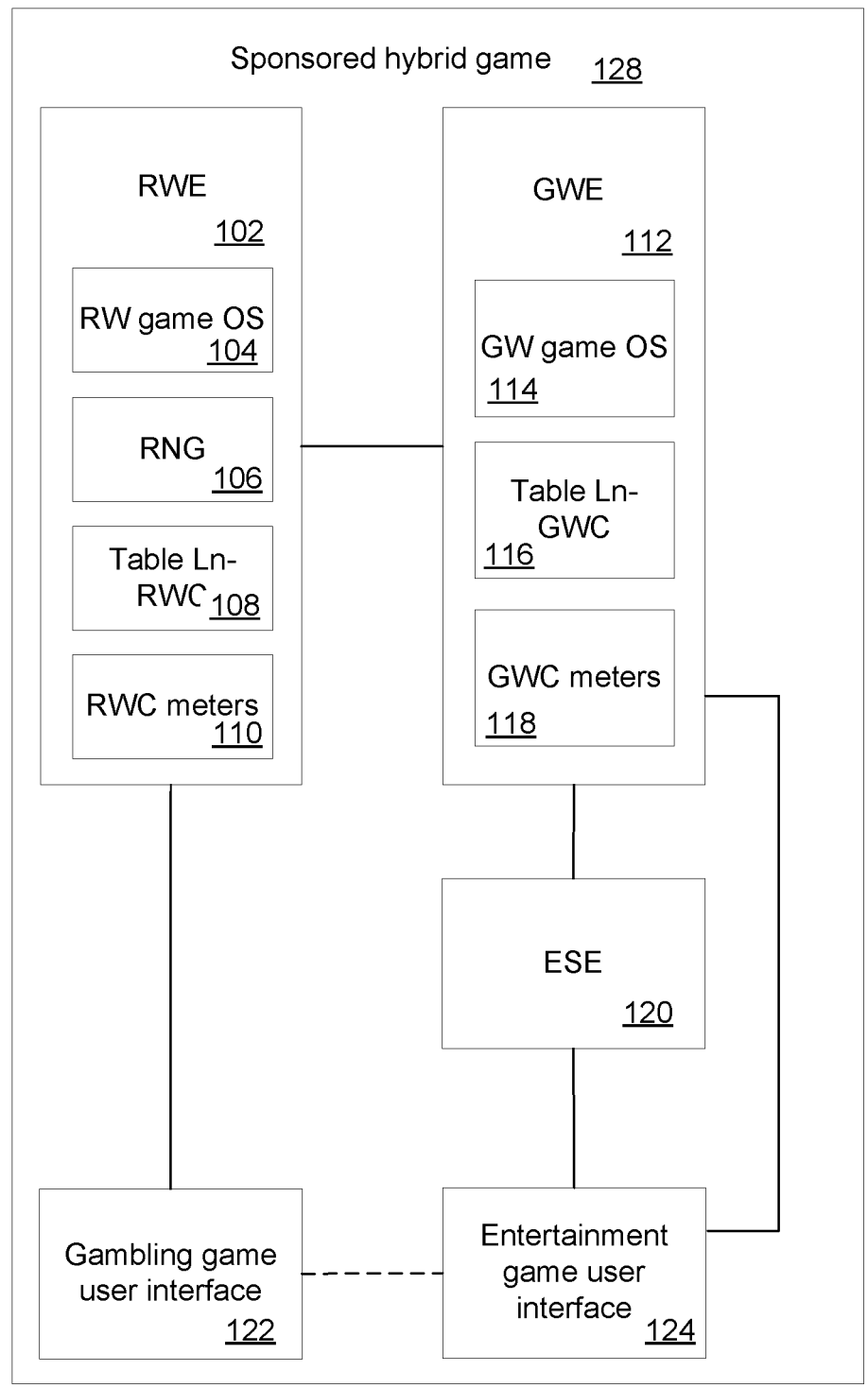
FIG. 1 illustrates a sponsored hybrid game in accordance with an embodiment of the invention.

Turning now to the drawings, systems and methods for operation of a sponsored hybrid game are illustrated. In several embodiments, a sponsored hybrid game is a form of a hybrid game that integrates a sponsorship module with both a gambling game that includes a real world engine (RWE) which manages the gambling game, as well as an entertainment game that includes a game world engine (GWE) which manages the entertainment portion of a game, and an entertainment software engine (ESE) which executes the entertainment game for user entertainment. In certain embodiments, the sponsored hybrid game also includes a user interface associated with either or both the gambling game and the entertainment game. In operation of a sponsored hybrid game, a player acts upon various types of elements of the entertainment game in a game world environment. Upon acting on some of these elements, a wager is triggered in the gambling game. In playing the entertainment game, using the elements, a player can consume and accrue game world credits (GWC) within the entertainment game. These credits can be in the form of (but are not limited to) game world objects, experience points, or points generally. Wagers are made in the gambling game using real world credits (RWC). The real world credits can be credits in an actual currency, or may be credits in a virtual currency which has real world value. Gambling outcomes from the gambling game may cause consumption, loss or accrual of RWC. In addition, gambling outcomes in the gambling game may influence elements in the entertainment game such as (but not limited to) by restoring a consumed element, causing the loss of an element, restoration or placement of a fixed element. Example elements include enabling elements (EE) which are elements that enable a player's play of the entertainment game and whose consumption by the player while playing the entertainment game may trigger a wager in a gambling game. In addition, EE may also be replenished during play within the entertainment game based on an outcome of a triggered wager. Other types of elements include actionable elements (AE) which are elements that are acted upon to trigger a wager in the gambling game and may not be restorable during normal play of the entertainment game. Various hybrid games are discussed in Patent Cooperation Treaty Application No. PCT/US11/26768, filed Mar. 1, 2011, entitled "ENRICHED GAME PLAY ENVIRONMENT (SINGLE and/or MULTI-PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety.

In many embodiments, a sponsored hybrid game enables players to enter sponsored gameplay with gameplay resources, such as but not limited to RWC, GWC, EE or AE, provided by a third party sponsor in return for the sponsor to receive an allocation of the payout of gameplay resources that result from the sponsored gameplay in accordance with the terms of the sponsorship. Thereby, in certain embodiments, a sponsored hybrid game can enable players to enter sponsored gameplay without utilization of the player's own resources and sponsors to reap a payout of gameplay resources without requiring gameplay participation.

In many embodiments, a sponsorship module coordinates interactions between players and sponsors that enables a player associated with a sponsored player profile to enter sponsored gameplay and allocates payouts of sponsored play according to the terms of the sponsorship accepted by both the sponsor and the player. In numerous embodiments, a sponsorship module can be implemented locally on a sponsored hybrid game within the GWE, remotely on a sponsorship server accessible to a sponsored hybrid game via a network or as a distributed system where processes of a sponsorship module occur locally on a sponsored hybrid game and on a remote server.

In several embodiments, sponsorship terms can encompass any arrangement that allocates gameplay resources among players and sponsors individually or as a group. Sponsorship terms can include (but is not limited to) the provision of RWC, GWC, EE, AE, from one or more sponsors to one or more players in return for an allocation of a payout of RWC, GWC, EE, AE to one or more sponsors. In certain embodiments, sponsorship terms can include the provision of gameplay resources such as (but not limited to) an advantageous celebrity player or an advantageous playing field provided by a sponsor for utilization by a player during sponsored gameplay of a sports type of entertainment game.

In several embodiments, one or more players can engage in sponsored gameplay on a sponsored hybrid game. Sponsored gameplay can be head-to-head or multi-player as a function of the specific sponsored hybrid game in question. Head-to-head sponsored gameplay can be player vs. machine in a single-player mode or multi-player mode, and can also be player vs. machine and/or other player(s) as a function of a specific sponsored hybrid game. Also, a player entering sponsored gameplay need not be playing with or against other players that enter gameplay with gameplay resources provided by a sponsor.

In numerous embodiments, a sponsored hybrid game can be monitored by a regulatory authority or an operator to gather information concerning the activities of the sponsored hybrid game such as but not limited to sponsored gameplay or the allocation of the payout that result from sponsored gameplay. In several embodiments, the monitoring can be utilized to ensure the integrity of activities performed by the sponsored hybrid game or to exact a payment from players or sponsors for utilization of the sponsored hybrid game. Regulatory authorities or operators of a sponsored hybrid game (such as but not limited to a casino that hosts sponsored hybrid games) can monitor a sponsored hybrid game by utilizing a module that monitors sponsored hybrid game activity such as but not limited to a regulatory scanning and screening audit (RSSA) module, anti-sandbagging module, anti-cheating module or any module that implements processes to monitor a sponsored hybrid game for unauthorized activities. Various configurations of regulatory scanning and screening audit (RSSA) modules interfaced with hybrid games are discussed in U.S. Provisional Patent Application No. 61/519,914, filed Jun. 1, 2011, and Patent Cooperation Treaty Application No. PCT/US12/40548, filed Jun. 1, 2012, entitled "SYSTEMS AND METHODS FOR REGULATED HYBRID GAMING" each disclosure of which is hereby incorporated by reference in its entirety. Additionally, numerous systems and methods capable of monitoring a sponsored hybrid game are discussed in U.S. Provisional Patent Application No. 61/627,737 and U.S. Provisional Patent Application No. 61/627,769, Patent Cooperation Treaty Application No. PCT/US12/60685, filed Oct. 17, 2012, entitled "SKILL NORMALIZED HYBRID GAME" and Patent Cooperation Treaty Application No. PCT/US12/60679, filed Oct. 27, 2012, entitled "ANTI-SANDBAGGING IN HEAD-TO-HEAD GAMING FOR ENRICHED GAME PLAY ENVIRONMENT" each disclosure of which is hereby incorporated by reference in its entirety.

Sponsored hybrid games in accordance with embodiments of the invention are discussed below.

Sponsored Hybrid Games

In many embodiments, a sponsored hybrid game integrates high levels of entertainment content with a game of skill (entertainment game), a gambling experience with a game of chance (gambling game). A sponsored hybrid game provides for random outcomes independent of player skill while providing that the user's gaming experience (as measured by obstacles/challenges encountered, time of play and other factors) is shaped by the player's skill. A sponsored hybrid game in accordance with an embodiment of the invention is illustrated in FIG. 1. The sponsored hybrid game 128 includes a RWE 102, GWE 112, ESE 120, gambling game user interface 122 and entertainment game user interface 124. The two user interfaces may be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In several embodiments, the RWE 102 is the operating system for the gambling game of the skill calibrated hybrid game 128 and controls and operates the gambling game. The operation of a gambling game is enabled by RWC, such as money or other real world funds. A gambling game can increase or decreases an amount of RWC based on random gambling outcomes, where the gambling proposition of a gambling game is typically regulated by gaming control bodies. In many embodiments, the RWE includes a RW operating system (OS) 104, random number generator (RNG) 106, level "n" real-world credit pay tables (Table Ln-RWC) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level "n" real-world credit pay table (Table Ln-RWC) 108 is a table that can be used in conjunction with a random number generator (RNG) 106 to dictate the real world credits (RWC) earned as a function of sponsored gameplay and is analogous to the pay tables used in a conventional slot machine. Table Ln-RWC payouts are independent of player skill. There may be one or a plurality of Table Ln-RWC pay tables 108 contained in a gambling game, the selection of which may be determined by factors including (but not limited to) game progress a player has earned, and/or bonus rounds which a player may be eligible for. Real world credits (RWC) are credits analogous to slot machine game credits, which are entered into a gambling game by the user, either in the form of money such as hard currency or electronic funds. RWCs can be decremented or augmented based on the outcome of a random number generator according to the Table Ln-RWC real world credits pay table 108, independent of player skill. In certain embodiments, an amount of RWC can be required to enter higher ESE game levels. RWC can be carried forward to higher game levels or paid out if a cash out is opted for by a player. The amount of RWC required to enter a specific level of the game "level n" need not be the same for each level.

In many embodiments, the GWE 112 manages the overall sponsored hybrid game operation, with the RWE 102 and the ESE 120 effectively being support units to the GWE 112. In several embodiments, the GWE 112 contains mechanical, electronic and software system for an entertainment game. The GWE 112 includes a GW game operating system (OS) 114 that provides control of the entertainment game. The GWE additionally contains a level "n" game world credit pay table (Table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

The GWE can also be used to implement a sponsorship module constructed to coordinate activities between sponsors and players.

In many embodiments, a level "n" game world credit pay table (Table Ln-GWC) 116 dictates the GWC earned as a function of player skill in the nth level of the game. The payouts governed by this table are dependent upon player skill and sponsored gameplay at large and may or may not be coupled to a random number generator. In several embodiments, game world credits (GWC) are player points earned or depleted as a function of player skill, i.e. as a function of player performance in the context of the game. GWC is analogous to the "score" in a typical video game. Each entertainment game has one or more scoring criterion, embedded within the Table Ln-GWC 116 that reflects player performance against the goal(s) of the game. GWC can be carried forward from one level of sponsored gameplay to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In certain embodiments, the operation of the GWE does not affect the RWE's gambling operation except for player choice parameters that are allowable in slot machines today including but not limited to the wager amount, how fast the player wants to play (by pressing a button or pulling the slot's handle) and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RWC available in the gambling game. The communication link can also convey a necessary status operation of the RWE (such as on-line or tilt). The communication link can further communicate the various gambling control factors which the RWE 102 uses as input, such as the number of RWC consumed per game or the player's election to enter a jackpot round. In FIG. 1, the GWE 112 is also shown as connecting to the player's user interface directly, as this may be necessary to communicate certain entertainment game club points, player status, control the selection of choices and messages which a player may find useful in order to adjust their entertainment game experience or understand their gambling status in the RWE 102.

In various embodiments, the ESE 120 manages and controls the visual, audio, and player control for the entertainment game. In certain embodiments, the ESE 120 accepts input from a player through a set of hand controls, and/or head, gesture, and/or eye tracking systems and outputs video, audio and/or other sensory output to a user interface. In many embodiments, the ESE 120 can exchange data with and accept control information from the GWE 112. In several embodiments an ESE 120 can be implemented using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In numerous embodiments, an ESE can be an electromechanical game system of a sponsored hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 may send certain GW game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements may be based on a gambling outcome of a gambling game that was triggered by an element in the entertainment game being acted upon by the player. The ESE 120 can accept this input from the GWE 112, make adjustments, and continue the play action all the while running seamlessly from the player's perspective. The ESE's operation is mostly skill based, except for where the ESE's processes may inject complexities into the game by chance in its normal operation to create unpredictability in the entertainment game. Utilizing this interface, the ESE 120 may also communicate player choices made in the game to the GWE 112, such as but not limited to selection of a different gun, and/or the player picking up a special potion in the GW environment. The GWE's job in this architecture, being interfaced thusly to the ESE 120, is to allow the transparent coupling of entertainment software to a fair and transparent random chance gambling game, providing a seamless perspective to the player that they are playing a typical popular entertainment game (which is skill based). In certain embodiments, the ESE 120 can be used to enable a wide range of games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In several embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of games per minute the RWE 102 can execute, entrance into a bonus round, and other factors, all the while these factors can take a different form than that of a typical slot machine. An example of a varying wager amount that the player can choose might be that they have decided to play with a more powerful character in the game, a more powerful gun, or a better car. These choices can increase or decrease the amount wagered per individual gambling game, in the same manner that a standard slot machine player may decide to wager more or less credits for each pull of the handle. In several embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In a particular embodiment, the RWE 102 operation can be a game of chance as a gambling game running every 10 seconds where the amount wagered is communicated from the GWE 112 as a function of choices the player makes in the operation profile in the entertainment game such as those cited above.

In many embodiments, a sponsored hybrid game integrates a video game style gambling machine, where the gambling game (i.e. RWE 102 and RWC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time a rich environment of rewards to stimulate "garners" can be established with the entertainment game. In several embodiments, the sponsored hybrid game can leverage very popular titles with "garners" and provides a sea change environment for casinos to attract players with games that are more akin to the type of entertainment which a younger generation desires. In various embodiments, players can use their skill towards building and banking GWC which in turn can be used to win tournaments and various prizes as a function of their "gamer" prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In certain embodiments, sponsored hybrid games also allow players to gain entry into subsequent competitions through the accumulation of game world credits (GWC) that accrue as a function of the user's demonstrated skill at the game. These competitions can pit individual players or groups of players against one another and/or against the casino to win prizes based upon a combination of chance and skill. These competitions may be either asynchronous events, whereby players participate at a time and/or place of their choosing, or they may be synchronized events, whereby players participate at a specific time and/or venue.

In many embodiments, one or more players engage in playing an entertainment game, resident in the ESE, the outcomes of which are dependent at least in part on skill. The sponsored hybrid game can include an entertainment game that includes head-to-head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

In many embodiments, if an entertainment game includes a version of Madden Football™ a player can bet on whether or not the player is going to beat the computer, or if the player is playing against another player, that other player. These bets can be made, for example, on the final outcome of the game, and/or the state of the game along various intermediary points (such as but not limited to the score at the end of the 1st quarter) and/or on various measures associated with the game (such as but not limited to the total offensive yards, number of turnovers, or number of sacks). Players can bet against one another, or engage the computer in a head-to-head competition in the context of their skill level in the entertainment game in question. As such, players can have a handicap associated with their player profile that describes their skill (which can be their "professed skill" in certain embodiments), and which is used by a GWE (such as a local GWE or a GWE that receives services from remote servers) to offer appropriate bets around the final and/or intermediate outcomes of the entertainment game, and/or to condition sponsored gameplay as a function of player skill, and/or to select players across one or more sponsored hybrid games to participate in head to head games and/or tournaments.

Many embodiments enable the maximization of the number of players able to compete competitively by utilizing a skill normalization module. Handicapping enables players of varying performance potential to compete competitively regardless of absolute skill level, such as but not limited to where a player whose skill level identifies the player as a beginner can compete in head-to-head or tournament play against a highly skilled player with meaningful results.

In several embodiments, wagers can be made among numerous sponsored hybrid games with a global betting manager (GBM). The GBM is a system that coordinates wagers that are made across multiple sponsored hybrid games by multiple players. In some implementations it can also support wagers by third parties relative to the in game performance of other players. The GBM can stand alone, or is capable of being embedded in one of a number of systems, including a GWE, ESE or any remote server capable of providing services to a sponsored hybrid game, or can operate independently on one or a number of servers on-site at a casino, as part of a larger network and/or the internet or "cloud" in general. The GBM also supports the management of lottery tickets issued as a function of sponsored gameplay.

In many embodiments, third parties that are not playing a hybrid game can sponsor, wager and/or view play of a sponsored hybrid game. These third parties can include but are not limited to sponsors of hybrid gameplay. A third party sponsor can sponsor any aspect of sponsored gameplay, including but not limited to sponsoring specific players, play amongst particular players, sponsored gameplay sessions, or a sponsored hybrid games themselves. A GWE may relay information to a non-player interface for third parties to gather information concerning entertainment game play. In embodiments where the entertainment game is a fighting game, third parties may want to witness the movements of the game characters rather than simply the outcome of a fight. Therefore, the GWE can transmit information not only to the entertainment game user interface, but also to a non-player interface.

In various embodiments, a third party can see only select information about the gameplay and players on a non-player interface. This information can include (but is not limited to) EE values, GWC, RW wagers, sponsorship terms, information derived from sponsorable player profiles or any other information that can be transmitted to the GW user interface.

For instance, the entertainment gameplay information may be visible to third parties on a non-player interface, but not information concerning the wagers a player is making in a gambling game of the sponsored hybrid game. Alternatively, in a shooter game, the third parties may be able to see how much health each player has remaining, but has no information about how much ammunition each player has.

In a number of embodiments, a non-player interface can include information that is not directly related to the entertainment game play of a particular sponsored hybrid game. This information can include, but is not limited to, the number of players betting on the entertainment game play, side-bets available, or leader-boards. Information available to a non-player interface may or may not be also visible in an entertainment game user interface.

In numerous embodiments, sponsors can interact with a sponsored hybrid game by utilizing the non-player interface. The non-player interface can communicate information generated by the sponsor at the non-player interface to a sponsorship module that coordinates activities of a sponsored hybrid game. The non-player interface can also communicate any information relevant to sponsored gameplay to a sponsor that utilizes the non-player interface such as but not limited to players that can be sponsored, sponsorship terms, acceptance of sponsorship terms, and information related to the allocation of a payout resulting from sponsored gameplay. In certain embodiments, sponsors can access any information useful to a sponsor to make sponsorship decisions on a non-player interface, such as (but not limited to) player ratings, player gameplay history, and/or player rankings from sponsorable player profiles.

Figure 2:
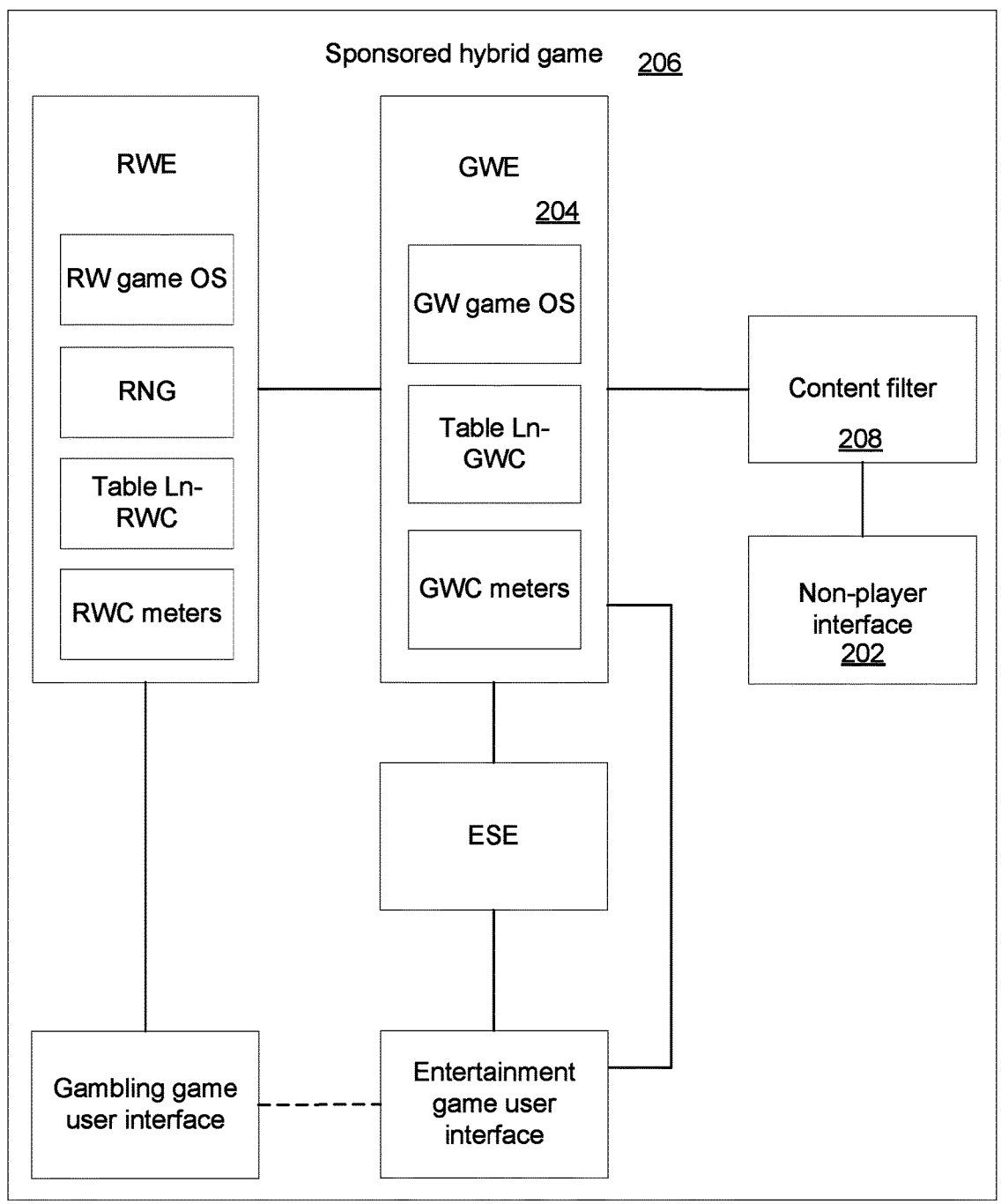
FIG. 2 illustrates a sponsored hybrid game with a non-player interface in accordance with an embodiment of the invention.

A sponsored hybrid game utilizing a non-player interface is illustrated in FIG. 2. The non-player interface 202 communicates with the GWE 204 of a sponsored hybrid game 206 to display information relating to entertainment gameplay or any other information concerning a sponsored hybrid game through a content filter 208. The content filter can determine what information is accessible to the non-player interface 202, such as (but not limited to) whether the non-player interface 202 can see the gameplay progress of all or only some of the players, or whether the non-player interface presents certain information concerning player profiles in accordance with permissions set by a player associated with the player profile or an operator of the sponsored hybrid game (such as but not limited to) a casino that hosts the sponsored hybrid game.

In numerous embodiments, a sponsored hybrid game can be monitored by a regulatory authority or an operator that hosts the sponsored hybrid game. This monitoring can encompass any aspect of a sponsored hybrid game, including (but not limited to) a player's transaction history with a sponsored hybrid game or a history of information related to player profiles. In many embodiments, monitoring of a sponsored hybrid game is accomplished by utilizing a regulatory scanning and screening audit (RSSA) module interfaced with a sponsored hybrid game. An RSSA module enables regulation of a sponsored hybrid game (such as by a regulatory authority) by logging, detecting and defeating the use of cheats, or other unauthorized sponsored hybrid game performance. The RSSA module can monitor a sponsored hybrid game through tap points from which the RSSA module can collect data about the sponsored hybrid game. The tap points can capture data from the sponsored hybrid game at any point of operation within the sponsored hybrid game. The RSSA module can also control the sponsored hybrid game through control signals sent from the RSSA module to the sponsored hybrid game. In several embodiments, the RSSA module is part of an RSSA system that monitors and controls several RSSA modules. The RSSA module can also include a number of operating modes, such as a game supervisory mode, a game profile learning mode, operating monitor mode, audit mode and playback mode. Each operating mode may also include a number of sub-functions such as where an operating monitor mode includes a player profiling, keystroke scanning or game session recording sub-function. These modes enable the sponsored hybrid game to learn a profile and to monitor the operation of the sponsored hybrid game to detect unauthorized usage of a sponsored hybrid game (such as with a cheat).

In numerous embodiments, a regulatory body or an auditor can utilize an RSSA module or RSSA system of networked RSSA modules to ascertain the fairness of the system by determining that the entertainment portion of the sponsored hybrid game is not being manipulated by a player through the unauthorized use of the sponsored hybrid game, such as (but not limited to) through use of cheats or other methods which may have been embedded in the entertainment game. The nature of unauthorized use, such as cheats, is especially harmful in the context of a gambling experience, where cheats can be destructive to the fairness of the system.

Figure 3:
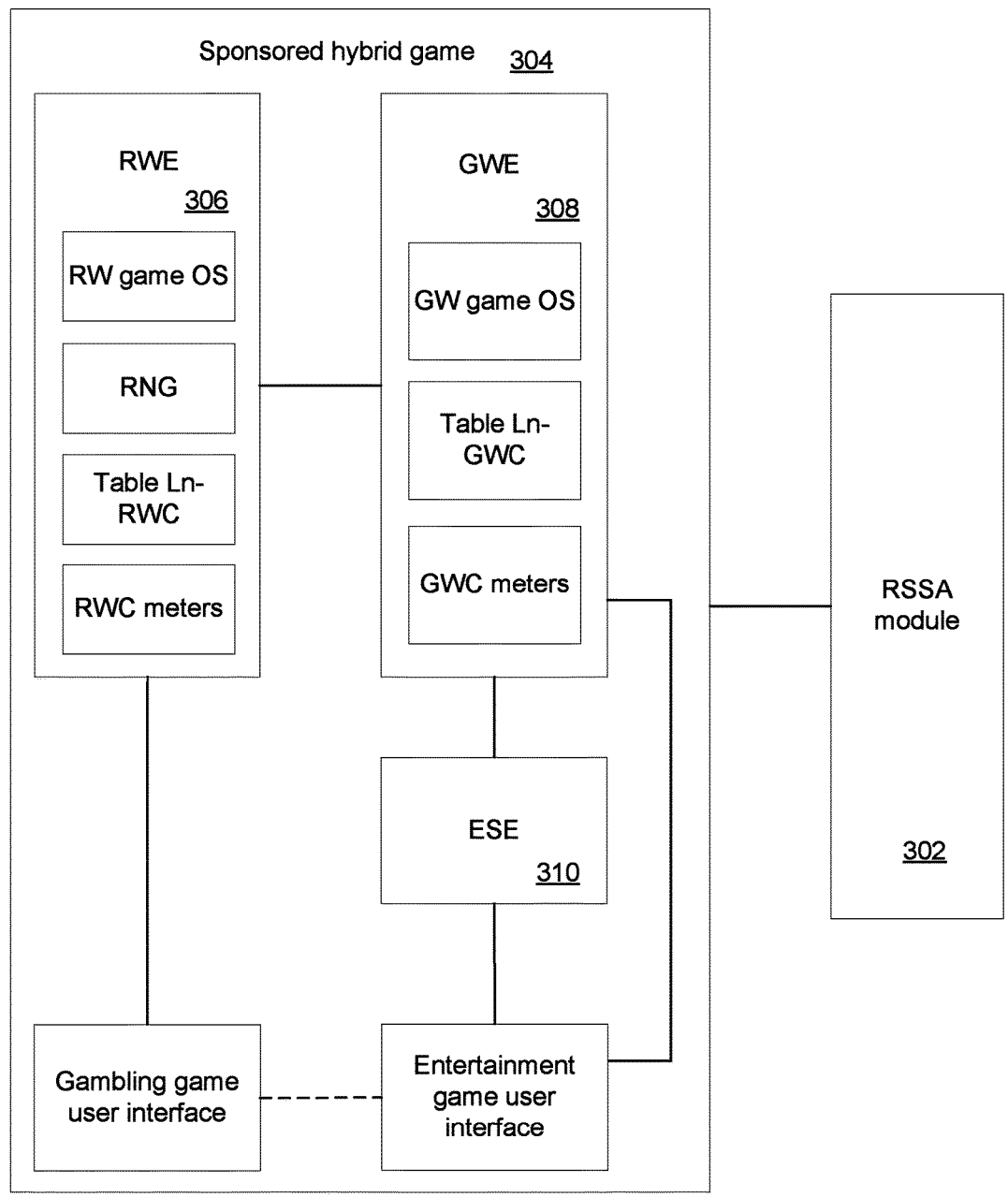
FIG. 3 illustrates a sponsored hybrid game with a regulatory scanning and screening audit (RSSA) module in accordance with an embodiment of the invention.

A sponsored hybrid game interfaced with an RSSA module is illustrated in FIG. 3. The RSSA module 302 is connected with a sponsored hybrid game 304. The connection enables an RSSA module to communicate with, monitor and/or control the sponsored hybrid game 304, such as but not limited to detecting any unauthorized activity or performance in the sponsored hybrid game. The RSSA module 302 can directly interact with the sponsored hybrid game through the utilization of tap points connected with any aspect of the sponsored hybrid game including, but not limited to the RWE 306, GWE 308 or ESE 310.

Although various components of sponsored hybrid games are discussed above, sponsored hybrid games can be configured with any component appropriate to the requirements of a specific application in accordance with embodiments of the invention. Network connected sponsored hybrid games are discussed below.

Network Connected Sponsored Hybrid Games

Sponsored hybrid games in accordance with many embodiments of the invention can operate locally while being network connected to draw services from remote locations or to communicate with other sponsored hybrid games. In many embodiments, operations associated with a sponsored hybrid game such as (but not limited to) processes for calculating score or RWC and GWC tracking can be performed across multiple devices. These multiple devices can be implemented using a single server or a plurality of servers such that a sponsored hybrid game is executed as a system in a virtualized space, such as (but not limited to) where the RWE and GWE are large scale centralized servers "in the cloud" coupled to a plurality of widely distributed ESE controllers or clients via the Internet.

In many embodiments, an RWE server can perform certain functionalities of a RWE of a sponsored hybrid game. In certain embodiments, a RWE server includes a centralized odds engine which can generate random outcomes (such as but not limited to win/loss outcomes) for a gambling game, thereby eliminating the need to have that functionality of the RWE performed locally within the sponsored hybrid game. The RWE server can perform a number of simultaneous or pseudo-simultaneous runs in order to generate random outcomes for a variety of odds percentages that one or more networked sponsored hybrid games may require. In certain embodiments, an RWE of a sponsored hybrid game can send information to a RWE server including (but not limited to) Table Ln-RWC tables, maximum speed of play for a gambling game, gambling game monetary denominations or any promotional RWC provided by the operator of the sponsored hybrid game. In particular embodiments, a RWE server can send information to a RWE of a sponsored hybrid game including (but not limited to) RWC used in the gambling game, player profile information or play activity and a profile associated with a player.

In several embodiments, a GWE server can perform the functionality of the GWE across various sponsored hybrid games. These functionalities can include (but are not limited to) providing a method for monitoring high scores on select groups of games, linking groups of games in order to join them in head-to-head tournaments, and acting as a tournament manager. A sponsorship module can execute as part of a GWE server to coordinate sponsored hybrid gameplay between sponsors and players.

In a variety of embodiments, management of player profile information can be performed by a GWE patron management server separate from a GWE server. A GWE patron management server can manage player profile information, including (but not limited to) data concerning players' characters, players' game scores, players' RWC and GWC and managing tournament reservations. Although a GWE patron management server is discussed separate from a GWE server, in certain embodiments a GWE server also performs the functions of a GWE patron management server. In certain embodiments, a GWE of a sponsored hybrid game can send information to a GW patron management server including (but not limited to) GWC and RWC used in a game, player profile information, play activity and profile information for players and synchronization information between a gambling game and an entertainment game or other aspects of a sponsored hybrid game. In particular embodiments, a GW patron management server can send information to a GWE of a sponsored hybrid game including (but not limited to) entertainment game title and type, tournament information, Table Ln-GWC tables, special offers, character or profile setup and synchronization information between a gambling game and an entertainment game or other aspects of a sponsored hybrid game.

In numerous embodiments, an ESE server provides a host for managing head-to-head play, operating on the network of ESEs which are connected to the ESE server by providing an environment where players can compete directly with one another and interact with other players. Although an ESE server is discussed separate from a GWE server, in certain embodiments a GWE server also performs the functions of an ESE server.

In a number of embodiments, an RSSA server can implement an RSSA module to monitor and regulate sponsored hybrid game activity. The RSSA server can implement any of the functionalities of an RSSA module including, but not limited to, monitoring a sponsored hybrid game through tap points from which the RSSA server can collect data about the sponsored hybrid game. The tap points can capture data from the sponsored hybrid game at any point of operation within the network connected sponsored hybrid game. The RSSA server can also control the sponsored hybrid game through control signals sent from the RSSA server to various network distributed parts of a network connected sponsored hybrid game. In several embodiments, the RSSA server is part of an RSSA system that monitors and controls several RSSA servers.

In several embodiments, a sponsorship server can be connected with a sponsored hybrid game and implement a sponsorship module to coordinate the activities of a sponsored hybrid game. A sponsorship server can coordinate interactions between players and sponsors that enable a player of a sponsored player profile to enter sponsored gameplay and allocate gameplay resources earned from a sponsored play payout according to the terms of the sponsorship accepted by both the sponsor and the player. In numerous embodiments, a sponsorship server can be part of a distributed system where processes of a sponsorship server occur across different sponsorship servers of a sponsorship server system.

Servers connected via a network to implement sponsored hybrid games in accordance with many embodiments of the invention can communicate with each other to provide services utilized within a sponsored hybrid game. In several embodiments a RWE server can communicate with a GWE server. A RWE server can communicate with a GWE server to communicate any type of information as appropriate for a specific application, including (but not limited to): configure the various simultaneous or pseudo simultaneous odds engines executing in parallel within the RWE to accomplish the sponsored hybrid game system requirements, determine metrics of RWE performance such as random executions run and outcomes for tracking system performance, perform audits, provide operator reports, and request the results of a random run win/loss result for use of function operating within the GWE (such as where automatic drawings for prizes are a function of ESE performance).

In several embodiments a GWE server can communicate with an ESE server. A GWE server can communicate with an ESE server to communicate any type of information as appropriate for a specific application, including (but not limited to): the management of an ESE server by a GWE server such as the management of a sponsored hybrid game tournament. Typically a GWE (such as a GWE that runs within a sponsored hybrid game or on a GWE server) is not aware of the relationship of itself to the rest of a tournament since in a typical configuration the actual tournament play is managed by the ESE server. Therefore, management of a sponsored hybrid game tournament can include (but is not limited to) tasks such as: conducting tournaments according to system programming that can be coordinated by an operator of the sponsored hybrid game; allowing entry of a particular player into a tournament; communicating the number of players in a tournament and the status of the tournament (such as but not limited to the amount of surviving players, their status within the game, time remaining on the tournament); communicating the status of an ESE contained in a game; communicating the performance of its players within the tournament; communicating the scores of the various members in the tournament; and providing a synchronizing link to connect the GWEs in a tournament, with their respective ESE's.

In several embodiments a GWE server can communicate with a GW patron server. A GWE server can communicate with a GW patron server to communicate any type of information as appropriate for a specific application, including (but not limited to) information for configuring tournaments according to system programming conducted by an operator of a sponsored hybrid game, exchange of data necessary to link a player's profile to their ability to participate in various forms of sponsored gameplay (such as but not limited to the difficulty of play set by the GWE server or the GWE in the game they are playing on), determining a player's ability to participate in a tournament as a function of a player's characteristics (such as but not limited to a player's gaming prowess or other metrics used for tournament screening), configuring the game contained GWE and ESE performance to suit preferences of a player on a particular sponsored hybrid game, as recorded in their player profile, determining a player's play and gambling performance for the purposes of marketing intelligence, and logging secondary drawing awards, tournament prizes, RWC and GWC into the player's profile.

In many embodiments, the actual location of where various algorithms and functions are executed may be located either in the game contained devices (RWE, GWE, ESE), on the servers (RWE server, GWE server, or ESE server), or a combination of both. In particular embodiments, certain functions of a RWE server, GWE server, GW patron server or ESE server may operate on the local RWE, GWE or ESE contained with a sponsored hybrid game locally. In certain embodiments, a server is a server system including a plurality of servers, where software may be run on one or more physical devices. Similarly, in particular embodiments, multiple servers may be combined on a single physical device.

Figure 4:
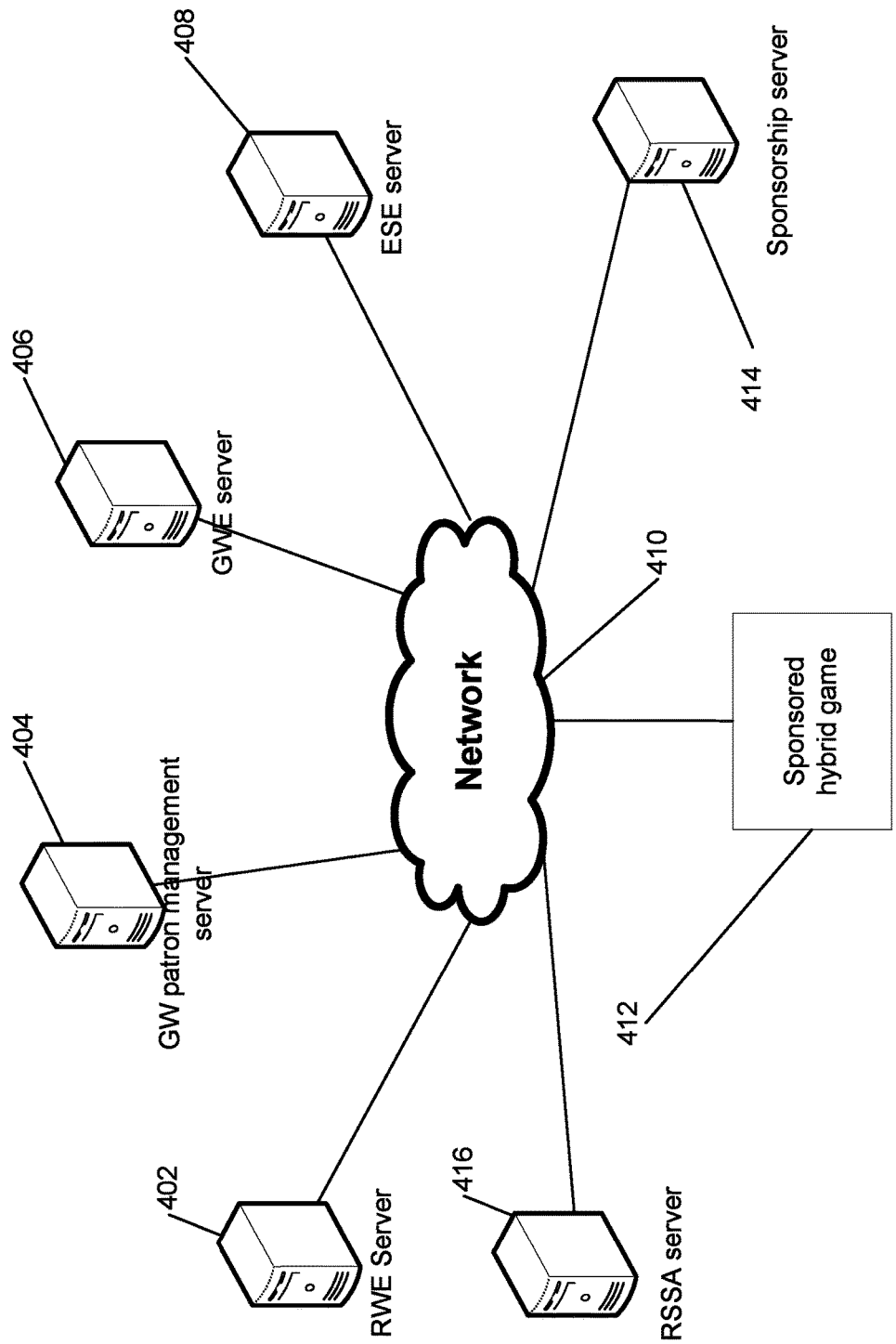
FIG. 4 is a system diagram that illustrates a network distributed sponsored hybrid game in accordance with an embodiment of the invention.

Sponsored hybrid games in accordance with many embodiments of the invention can be networked with remote servers in various configurations. A networked sponsored hybrid game in accordance with an embodiment of the invention is illustrated in FIG. 4. The networked sponsored hybrid game 412 is connected with a RWE server 402, GW patron management server 404, GWE server 406, ESE server 408, sponsorship server 414 and an RSSA server 416 over a network 410, such as (but not limited to) the Internet. Servers networked with a networked sponsored hybrid game 412 can also communicate with each of the components of a networked sponsored hybrid game and amongst the other servers in communication with the networked sponsored hybrid game 412.

Although various networked sponsored hybrid games are discussed above, networked sponsored hybrid games can be configured in any manner as appropriate to the requirements of a specific application in accordance with embodiments of the invention. Sponsorship modules capable of implementing the calibration of sponsored hybrid games are discussed below.

Sponsorship Modules

A sponsorship module in accordance with many embodiments of the invention can be utilized to coordinate the activities of a sponsored hybrid game such as (but not limited to) enabling a player of a sponsored player profile to enter sponsored gameplay and allocating sponsored play payout according to the terms of sponsorship accepted by both the sponsor and the player. In numerous embodiments, a sponsorship module maintains information related to the coordination of sponsored gameplay, such as (but not limited to) player profiles that include information concerning a player of a sponsored hybrid game, sponsor profiles that include information concerning a possible sponsor of sponsored hybrid game activities, sponsorship terms that dictate the nature of sponsorship between one or more sponsors and one or more players. The sponsorship terms can describe any aspect of sponsored gameplay capable of sponsorship such as the gameplay resources provided to a player and the allocation of the payout between one or more sponsors and one or more players resulting from the sponsored gameplay of a player once the sponsorship terms are accepted by both the player and the sponsor. In many embodiments, an acceptance of sponsored terms is an affirmative acceptance that can be received from both sponsor and player. In certain embodiments, an acceptance of sponsored play terms can occur without an affirmative acceptance by either a player or a sponsor, such as but not limited to where a player or a sponsor's profile is preprogrammed to accept particular sponsorship terms automatically or when a player or sponsor is required to accept certain sponsor terms in exchange for interacting with the sponsored hybrid game.

Figure 5:
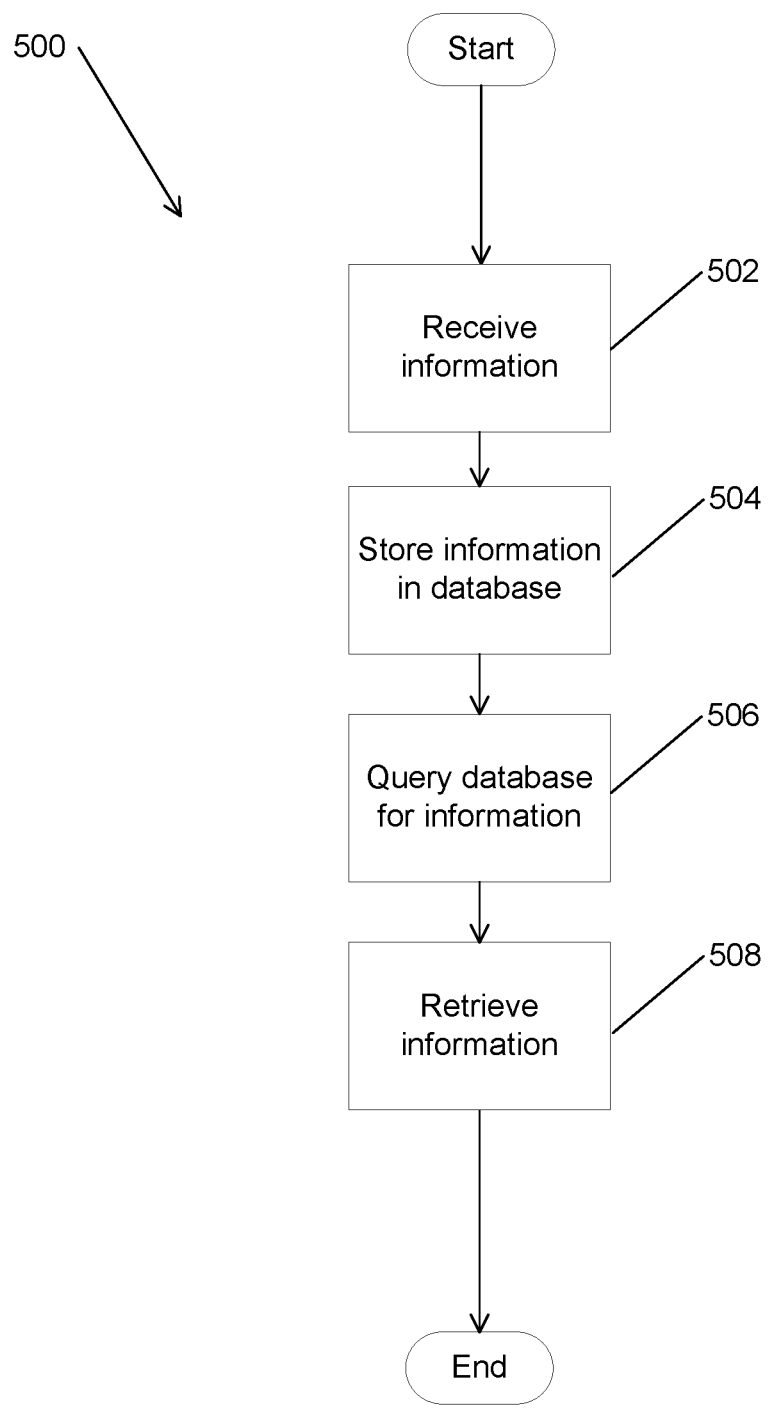
FIG. 5 is a flow chart of a process for storing and retrieving information using a database.

In many embodiments, a sponsorship module can utilize a database to store and retrieve information related to the coordination of sponsored gameplay. This information can be stored and retrieved according to metadata associated with the information in the database. The database can be any form of relational database system or flat file database system such as (but not limited to) a Structured Query Language (SQL) database or a SQLite database. In certain embodiments, a sponsorship module can utilize a form of storage that is not a relational or flat file database such as but not limited to a flat file. A flow chart of a process for storing and retrieving data in a database is illustrated in FIG. 5. The process 500 includes receiving (502) information. Once the information is received, it is stored (504) in the database using the sponsorship module. The sponsorship module can then query (506) the database for the information utilizing metadata from which the information can be identified. Once the information is found from the query (506), it can be retrieved (508) and utilized as appropriate to the requirements of a specific application.

Figure 6:
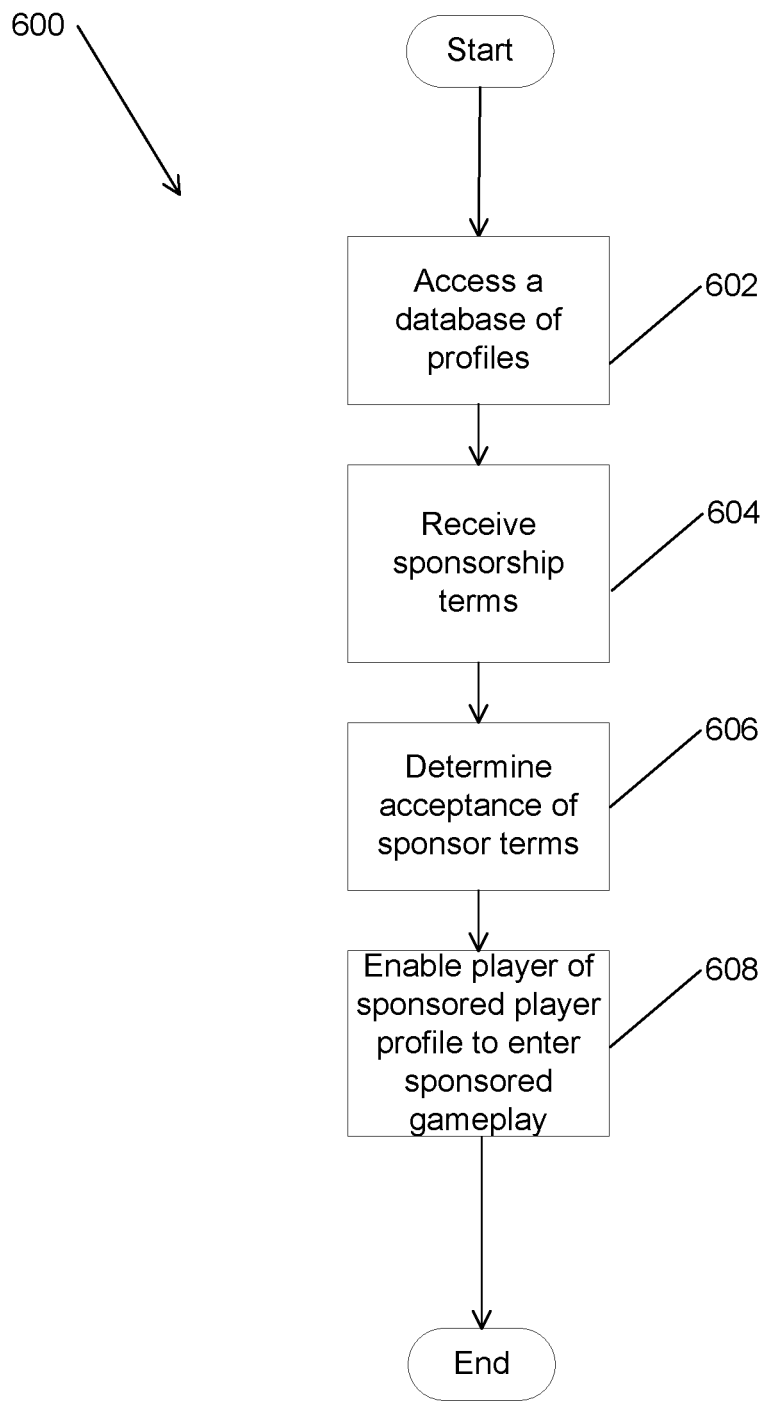
FIG. 6 is a flow chart of a process for enabling a player associated with a sponsored player profile to entered sponsored gameplay in accordance with an embodiment of the invention.

In numerous embodiments, a sponsorship module is constructed to coordinate activities in a sponsored hybrid game that enables a player of a sponsored player profile to enter sponsored gameplay. A flow chart of a process for enabling a player of a sponsored player profile to enter sponsored gameplay in accordance with an embodiment of the invention is illustrated in FIG. 6. The process 600 includes accessing (602) a database of profiles.

In various embodiments, a database of sponsorable player profiles is accessed. In certain embodiments, a sponsorship module can access a database of sponsorable player profiles that is generated by a sponsorship module. In particular embodiments, a database of sponsorable player profiles is a database that is populated with sponsorable player profiles along with other information that need not be related to sponsorable player profiles such as but not limited to player profiles that cannot be sponsored. A sponsorable player profile can be any player profile that indicates that a particular player can be sponsored and can be explicit (such as information stored in the player profile that indicates that the player is amenable to sponsorship) or implicit. A player profile can include an implicit indication that the player profile is sponsorable such as but not limited to a player profile designated as amenable to sponsorship by default as no information is available in the player profile that indicates if the player is amenable to sponsorship or any player profile that does not include information that indicates that the player profile is not amenable to sponsorship. In certain embodiments, a sponsored hybrid game can regulate the types of players that can receive sponsorship, such as but not limited to preventing a player associated with a player profile from receiving sponsorship, where the player profile indicates insufficient play history or in accordance with any other criterion appropriate to the requirements of a specific application.

In numerous embodiments, players can solicit sponsorship from sponsors. In several embodiments, solicitations can be facilitated by a sponsorship module constructed to access a database of sponsor profiles. The sponsorship module can be used to indicate an interest in soliciting sponsorship terms from a sponsor associated with the sponsor profile. In many embodiments, the sponsorship module can be used to directly send sponsorship terms to the sponsor profile. The sponsor can then indicate acceptance of the sponsorship terms for the player or return sponsorship terms to the player profile for the player to accept.

In numerous embodiments, a sponsorship module can receive (604) sponsorship terms. The sponsorship terms can dictate the terms of proposed sponsorship, such as but not limited to the gameplay resources provided by the sponsor and the allocation of sponsored gameplay resource payout amongst the player and sponsor. The sponsorship terms can be generated from either a player associated with the player profile or a sponsor associated with a sponsor profile. These sponsorship terms can be sent to a player profile or a sponsor profile in a database of profiles for acceptance by the player or sponsor associated with a player profile or sponsor profile.

In many embodiments, a sponsorship module can determine an acceptance of sponsorship terms (606). A determination of acceptance of sponsorship terms can be made from an explicit acceptance (such as but not limited to receiving a notification that the sponsorship terms have been accepted) or an implicit acceptance (such as but not limited to automatically accepting sponsorship terms if they meet a certain criteria). In many embodiments, an acceptance of sponsorship terms occurs when all sponsor and all players affected by the sponsorship terms accept the sponsorship terms. In some embodiments, the sponsorship terms are accepted when less than all of the sponsors or all of the players affected by the sponsorship terms accept the sponsorship terms.

In several embodiments, a sponsorship module can enable (608) a player of a sponsored profile associated with the sponsorship terms to enter sponsored gameplay utilizing the gameplay resources provided by a sponsor according to the sponsorship terms. A sponsorship module can enable sponsored gameplay by communicating with a GWE to allocate specific gameplay resources as dictated by the sponsorship terms to the appropriate player profile from the appropriate sponsor profile. A player associated with the player profile can then engage in sponsored gameplay with the resources provided by the sponsor according to the sponsorship terms.

Figure 7:
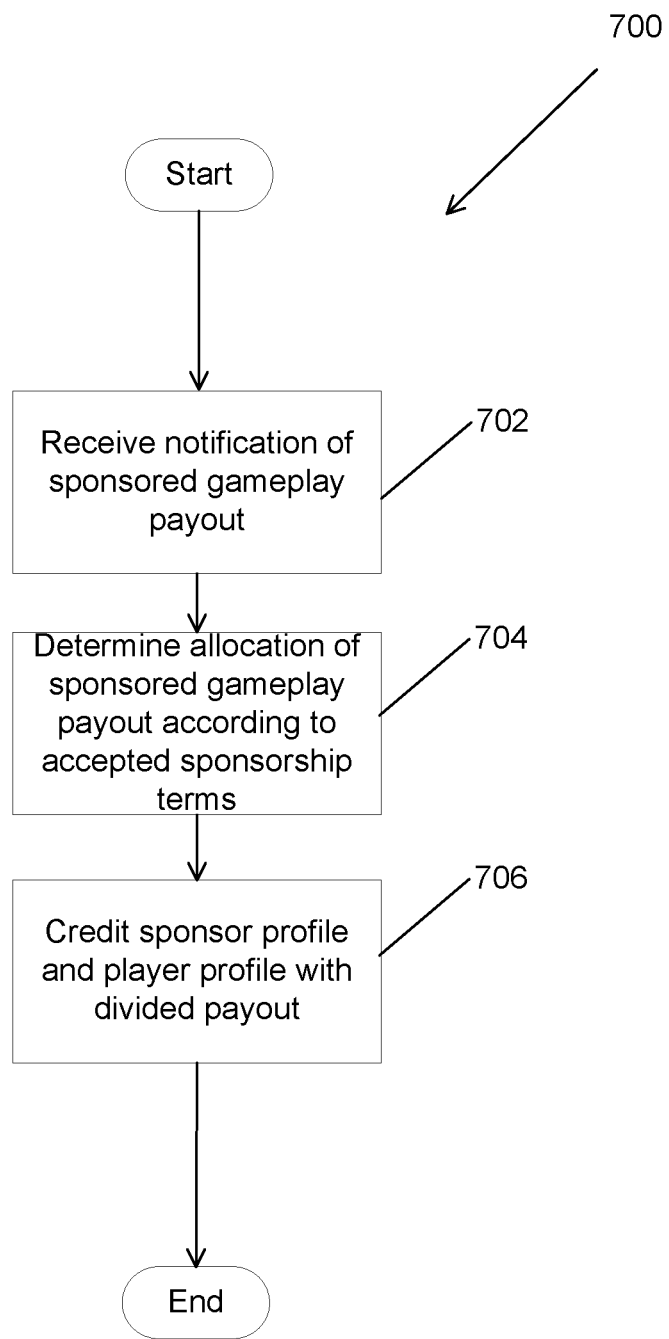
FIG. 7 is a flow chart of a process of allocating a payout between a sponsor profile and a player profile in accordance with an embodiment of the invention.

In numerous embodiments, a payout of gameplay resources can be allocated amongst players and sponsors in accordance with the sponsorship terms agreed upon between the players and sponsors. In many embodiments, the allocation of the payout can occur at any time after the payout is earned from a player's play of a sponsored hybrid game including (but not limited to) immediately after a payout of gameplay resources is earned, at times during sponsored gameplay, at the conclusion of a session of sponsored gameplay, at the conclusion of sponsored gameplay or sometime after sponsored gameplay. A flow chart of a process of allocating a payout between a sponsor profile and a player profile in accordance with an embodiment of the invention is illustrated in FIG. 7. The process 700 includes receiving (702) notification of a sponsored gameplay payout received by a sponsorship module from a GWE. In certain embodiments, the sponsorship module is implemented within the GWE where the sponsorship module communicates with various processes of a GWE. The sponsorship terms are then consulted in order to properly determine the allocation of the gameplay resources earned from the sponsored gameplay payout according to the sponsorship terms. Upon determining (704) the appropriate allocation of the gameplay resources, the sponsorship module communicates with the GWE to credit (706) the player profiles and/or sponsor profiles with the payout of gameplay resources resulting from sponsored gameplay in accordance with the sponsorship terms.

Although various constructions of a sponsorship module are discussed above, sponsorship modules can be constructed in any manner as appropriate to the requirements of a specific application in accordance with embodiments of the invention. Sponsorship terms that can be implemented in sponsored hybrid games are discussed below.

Sponsorship Terms

Sponsorship terms in accordance with many embodiments of the invention can be made to affect any gameplay resources available to a player or sponsor. In many embodiments, sponsorship terms are generated by either a player or sponsor and are accepted by both a player and sponsor. In certain embodiments, sponsorship terms are presented without any input from a player or sponsor, such as but not limited to when an operator of a sponsored hybrid game charges a fee of an amount of gameplay resources for usage of the sponsored hybrid game. In certain embodiments, sponsorship terms can include a sponsor contributing all of the RWC required to play a sponsored hybrid game. In particular embodiments, a sponsor may contribute only a portion of the RWC necessary for a player to play a hybrid game. In certain embodiments, a sponsor may pay an entry fee for a fee-based tournament implemented by a sponsored hybrid game based on chess, but the player would pay for the EE necessary for play of the sponsored hybrid game. In various embodiments, more than one sponsor may contribute to the RWC necessary for a player to enter play of a sponsored hybrid game. This group of sponsors may be formed in advance, or in an ad hoc fashion with contributions of gameplay resources that may or may not be equal.

In various embodiments, in addition to or instead of providing the RWC necessary for play of a sponsored hybrid game, a sponsor may elect to provide gameplay resources that provide other advantages to a player aside from merely providing RWC. These gameplay resources may not be necessary for a player to participate in play of a sponsored hybrid game, but can change the results of the entertainment game, and the payouts from the gambling game (such as but not limited to the number of times that a gambling game can be run during performance of an entertainment game). In certain embodiments where the entertainment game is based on Madden Football™, a sponsor can provide a player access to resources such as new players, additional game time, better field conditions, or a number of other benefits to game play as part of the sponsorship terms. Sponsored gameplay can therefore alter the odds, frequency of wagers, amount wagered or a variety of other gambling game factors due to the gameplay resources provided by the sponsorship terms as compared with non-sponsored gameplay In many embodiments, a sponsor can select sponsorship terms that provide a specific gameplay resource or range of gameplay resources available to the player that accepts the sponsorship terms. In certain embodiments where a sponsored hybrid game implements a football type of entertainment game, the third party may choose to make a celebrity character, such as Lawrence Taylor available to a player in sponsored gameplay, or instead may allow the player a choice of any Hall of Fame football character in sponsored gameplay. Gameplay resources such as a character that can be utilized in an entertainment game may already be accessible to a sponsor profile associated with a sponsor and available for permanent or temporary transfer as part of the sponsorship terms.

In numerous embodiments, sponsorship terms can include a sponsor contributing gameplay resources that then enable a player to gain access to other gameplay resources when combined with the player's own gameplay resources. In particular embodiments, a player can identify desired sponsorship terms in order to gain access to certain gameplay resources and solicit acceptance of the desired sponsorship terms from possible sponsors.

In various embodiments, a player can utilize gameplay resources provided in sponsored gameplay in any manner the player chooses in accordance with the sponsorship terms. In certain embodiments with a football type of entertainment game, a player may choose to utilize gameplay resources provided in sponsored gameplay to change the field conditions to be more advantageous to the player's team, rather than to select a new character.

In numerous embodiments, sponsorship terms can vary in accordance with the type of entertainment game entered by a player in sponsored gameplay. In certain embodiments, a player skilled in a racing game and less skilled in a shooting game can create sponsorship terms where the player will receive 30% of any payout from a racing type of entertainment game. However, the player may also specify in the sponsorship terms the player will receive only 10% of any payout in a shooting type of entertainment game.

In many embodiments, sponsorship terms can dictate that a sponsor can recover the entirety of the sponsor's initial contribution of gameplay resources before any other allocation of gameplay resources from a payout resulting from sponsored gameplay. In certain embodiments where a tournament requires 10 credits of GWC to enter and another 100 credits of GWC for EE in order to have meaningful gameplay, a sponsor may provide the 110 credits of GWC (or other appropriate amount) for the player as part of the sponsorship terms. The sponsorship terms can also dictate that if the player then achieves a payout of 300 credits of GWC, the sponsor is reimbursed the 110 GWC credits before the remaining 190 GWC credits are distributed between the sponsor and player. If the player achieved a payout of only 90 credits of GWC, then all 90 credits of GWC would be credited to the sponsor. In this way, an initial advanced sum of GWC is repaid prior to distribution of GWC surplus winnings between the sponsor and the player.

In several embodiments, sponsorship terms can dictate that a player will receive a flat percentage of a payout resulting from sponsored gameplay. In certain embodiments, sponsorship terms can dictate that a player receives a flat 10% of all winnings such that if the player wins 300 credits of GWC, then the player would be allocated 30 credits of GWC from that payout resulting from the sponsored gameplay. Similarly, if the player wins 90 credits of GWC, the player would receive 9 credits of GWC. In numerous embodiments, a range of calculations/algorithms can be used to allocate the gameplay resources earned from a payout in fixed proportions or on sliding or variable scales based upon a range of variables including (but not limited to) the amount of gameplay resources involved or player performance in sponsored gameplay. In several embodiments, sponsorship terms may dictate the allocation of gameplay resources from any kind of payout, including (but not limited to) payouts of RWC from a gambling game or payouts of GWC or RWC from only base rounds and not bonus awards.

In various embodiments, sponsorship terms may not include an allocation of gameplay resources that result from sponsored gameplay to either a player or a sponsor. In certain embodiments, players may be interested in participating in only playing a hybrid game rather than in any payout that can result from play of a hybrid game. For certain players, playing an entertainment game of a sponsored hybrid game may be considered valuable in itself without any need of being allocated a payout of RWC or GWC. Therefore, a sponsor may provide the gameplay resources allowing a player to participate, but any RWC payout that results from that sponsored gameplay would be allocated to the sponsor. Similarly, a player may generate or accept sponsorship terms where the player would only receive the GWC resulting from sponsored gameplay, while all the payouts of RWC are allocated to the sponsor. Indeed, any of a variety of sponsorship terms can be adopted by a sponsor and a player via a sponsorship module involving any allocation of GWC and/or RWC appropriate to the context of a specific application.

In many embodiments, sponsor terms may dictate that a player receive a flat amount of gameplay resources from a sponsor irrespective of the payout of gameplay resources resulting from the sponsored gameplay.

Although various sponsorship terms that can be implemented by rules within a sponsorship module are discussed above, sponsorship modules can be constructed in any manner appropriate to the requirements of a specific application in accordance with embodiments of the invention. Processing apparatuses that can be used to implement a sponsored hybrid game are discussed below.

Processing Apparatus

Figure 8:
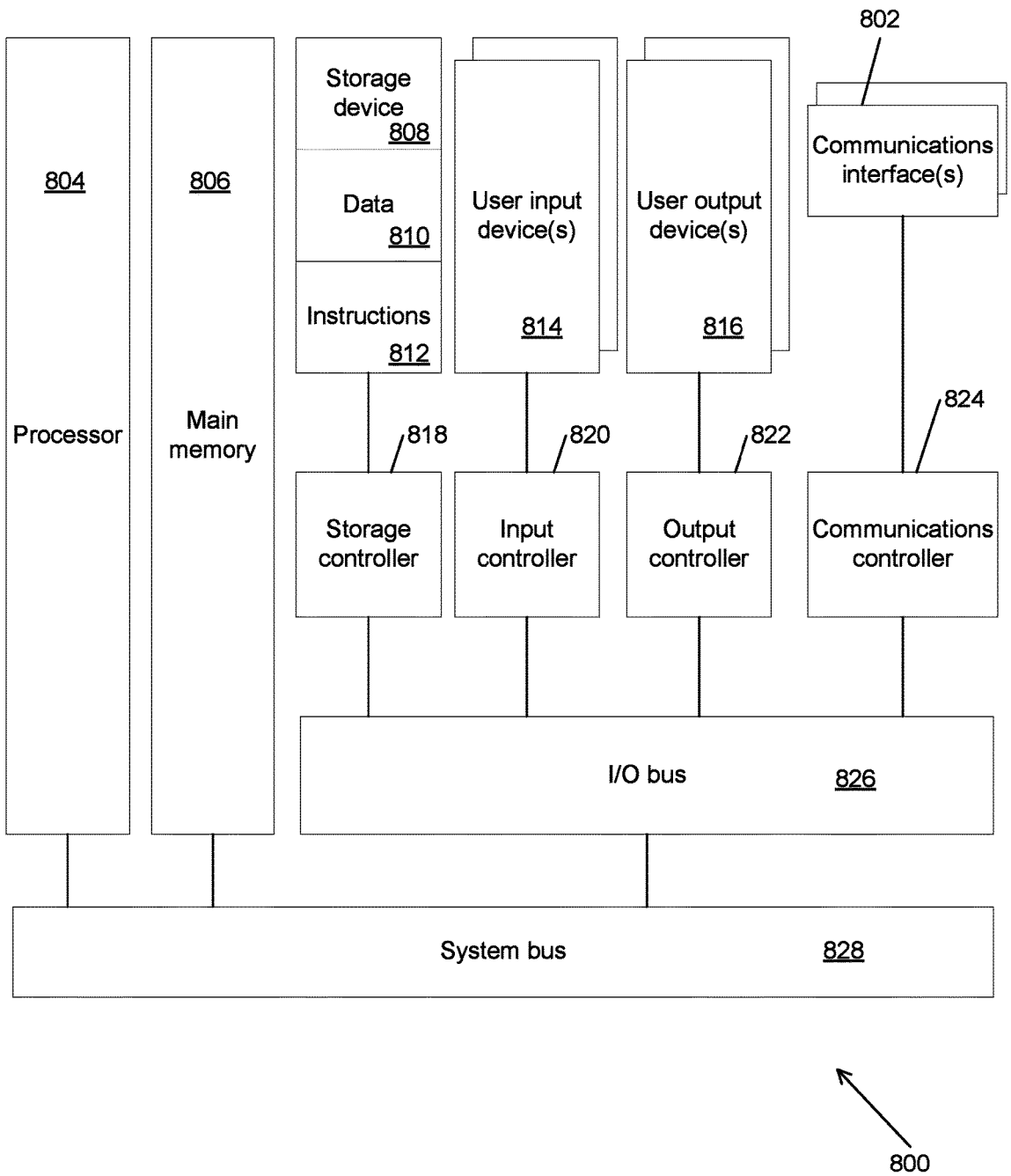
FIG. 8 illustrates a hardware architecture diagram of a processing apparatus utilized in the implementation of a sponsored hybrid game in accordance with an embodiment of the invention.

Any of a variety of processing apparatuses can host various components of a sponsored hybrid game in accordance with embodiments of the invention. In several embodiments, these processing apparatuses can include, but are not limited to, a gaming machine, a general purpose computer, a computing device and/or a controller. A processing apparatus that is constructed to implement a sponsored hybrid game in accordance with an embodiment of the invention is illustrated in FIG. 8. In the processing apparatus 800, a processor 804 is coupled to a memory 806 by a bus 828. The processor 804 is also coupled to non-transitory processor-readable storage media, such as a storage device 808 that stores processor-executable instructions 812 and data 810 through the system bus 828 to an I/O bus 826 through a storage controller 818. The processor 804 is also coupled to one or more interfaces that may be used to connect the processor to other processing apparatuses as well as networks as described herein. The processor 804 is also coupled via the bus to user input devices 814, such as tactile devices including but not limited to keyboards, keypads, foot pads, touch screens, and/or trackballs, as well as non-contact devices such as audio input devices, motion sensors and motion capture devices that the processing apparatus may use to receive inputs from a user when the user interacts with the processing apparatus. The processor 804 is connected to these user input devices 814 through the system bus 828, to the I/O bus 826 and through the input controller 820. The processor 804 is also coupled via the bus to user output devices 816 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 828 to the I/O bus 826 and through the output controller 822. The processor 804 can also be connected to a communications interface 802 from the system bus 828 to the I/O bus 826 through a communications controller 824.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, and/or owners as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as but not limited to a USB memory device, an optical CD ROM, magnetic media such as tape and disks. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an RWE, GWE or ESE as described herein can be implemented on multiple processing apparatuses, whether dedicated, shared or distributed in any combination thereof, or may be implemented on a single processing apparatus. In addition, while certain aspects and features of element management processes described herein have been attributed to an RWE, GWE, or ESE, these aspects and features may be implemented in a hybrid form where any of the features or aspects may be performed by any of a RWE, GWE, ESE within a sponsored hybrid game without deviating from the spirit of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. An electronic gaming machine constructed to receive real credits from a player, comprising:
   an entertainment software engine constructed to execute an entertainment game, the entertainment game including one or more elements for utilization by the player during skillful play of the entertainment game; a
   a real world engine coupled to a game world engine, wherein the real world engine is constructed to use a random number generator to generate and distribute a randomly generated payout of real world credits from a wager in a gambling game of a hybrid game;
   the game world engine coupled to the entertainment software engine, a non-player interface, and the real world engine, wherein the game world engine is constructed to:
   associate the player's utilization of the one or more elements of the entertainment game during skillful play of the entertainment game with a triggering of a commitment of a wager of real credits to the gambling game of the real world engine;
   access a database containing a player profile of the player and a sponsor profile of a non-player;
   distribute, to the non-player interface, information of sponsorship terms;
   generate a visual display of the sponsorship terms;
   receive, from the non-player interface, acceptance of the sponsorship terms via a user input device;
   allocate gameplay resources associated with the sponsor profile to the player profile based on sponsorship terms for use in sponsored gameplay of the hybrid game by the player; and
   allocate gameplay resources resulting from a payout of gameplay resources during the sponsored gameplay using the sponsorship terms.

2. The electronic gaming machine of claim 1 wherein the non-player interface presents information of the sponsor profile using a content filter to determine what information is accessible to the non-player interface.

3. The electronic gaming machine of claim 2 wherein the hybrid game is played by a plurality of players, and wherein the content filter determines whether gameplay progress of the plurality of players is accessible.

4. The electronic gaming machine of claim 2, wherein the content filter determines accessibility of information concerning the player profile in accordance with permissions set by a player associated with the player profile.

5. The electronic gaming machine of claim 1, wherein the non-player interface presents information of players that can be sponsored.

6. The electronic gaming machine of claim 1, wherein the non-player interface presents sponsorship terms involving allocation of gameplay resources during sponsored gameplay of the hybrid game between the player profile and the sponsor profile, wherein the sponsorship terms are generated by the non-player interface.

7. The electronic gaming machine 1, wherein the non-player interface presents information of the payout of gameplay resources resulting from the sponsored gameplay.

8. The electronic gaming machine of claim 1, wherein the game world engine and the entertainment software engine are constructed from the same device, and
   wherein the game world engine is operatively connected to the real world engine using a communication link.

9. The electronic gaming machine of claim 1, further comprising:
   an enclosure constructed to mount:
   a user input device operatively connected to the entertainment software engine;
   a user output device operatively connected to the entertainment software engine;
   a credit input device operatively connected to the real world engine; and
   a credit output device operatively connected to the real world engine.

10. An electronic gaming machine, comprising:
   a real world engine coupled to a game world engine over a network, wherein the real world engine is constructed to use a random number generator to generate and distribute a randomly generated payout of real world credits from a wager in a gambling game of a hybrid game; and the game world engine coupled to an entertainment software engine, a non-player interface, and the real world engine by the network, wherein the game world engine is constructed to:

access a database containing a player profile of the player and a sponsor profile of a non-player;

distribute, to the non-player interface, information of sponsorship terms;

generate a visual display of the sponsorship terms;

receive, from the non-player interface, acceptance of the sponsorship terms via a user input device;

allocate gameplay resources associated with the sponsor profile to the player profile based on the sponsorship terms for use in the sponsored gameplay of the hybrid game by the player; and allocate gameplay resources resulting from a payout of gameplay resources during the sponsored gameplay using the sponsorship terms.

11. The electronic gaming machine of claim 10, wherein the non-player interface presents information of the sponsor profile using a content filter to determine what information is accessible to the non-player interface.

12. The electronic gaming machine of claim 11, wherein the hybrid game is played by a plurality of players, and wherein the content filter determines whether gameplay progress of the plurality of players is accessible.

13. The electronic gaming machine of claim 11, wherein the content filter determines accessibility of information concerning the player profile in accordance with permissions set by a player associated with the player profile.

14. The electronic gaming machine of claim 10, wherein the non-player interface presents information of players that can be sponsored.

15. The electronic gaming machine of claim 10, wherein the non-player interface presents sponsorship terms involving allocation of gameplay resources during sponsored gameplay of the hybrid game between the player profile and the sponsor profile, wherein the sponsorship terms are generated by the non-player interface.

16. The electronic gaming machine 10, wherein the non-player interface presents information of the payout of gameplay resources resulting from the sponsored gameplay.

17. The electronic gaming machine of claim 10, wherein the game world engine and the entertainment software engine are constructed from the same device, and wherein the game world engine is operatively connected to the real world engine using a communication link.

18. The electronic gaming machine of claim 1, further comprising:

an enclosure constructed to mount:

a user input device operatively connected to the entertainment software engine;

a user output device operatively connected to the entertainment software engine;

a credit input device operatively connected to the real world engine; and a credit output device operatively connected to the real world engine.

* * * * *

UNITED STATES PATENT AND TRADEMARK OFFICE
CERTIFICATE OF CORRECTION

PATENT NO.         : 9,881,456 B2
APPLICATION NO.    : 15/375711
DATED              : January 30, 2018
INVENTOR(S)        : Miles Amone and Caitlyn Ross Page 1 of 1

It is certified that error appears in the above-identified patent and that said Letters Patent is hereby corrected as shown below:

In the Claims

Column 21, Line 62, Claim 1 currently reads: during skillful play of the entertainment game; a
Replace with: during skillful play of the entertainment game;

Signed and Sealed this
First Day of May, 2018

Andrei Iancu
*Director of the United States Patent and Trademark Office*